US009569831B2

(12) United States Patent
Song et al.

(10) Patent No.: US 9,569,831 B2
(45) Date of Patent: Feb. 14, 2017

(54) IMAGE PROCESSING APPARATUS, IMAGE PROCESSING METHOD, AND NON-TRANSITORY COMPUTER-READABLE STORAGE MEDIUM FOR EXTRACTING INFORMATION EMBEDDED IN A PRINTED MATERIAL

(71) Applicant: CANON KABUSHIKI KAISHA, Tokyo (JP)

(72) Inventors: Wei Song, Kawasaki (JP); Nobutaka Miyake, Yokohama (JP); Yuki Ishida, Kawasaki (JP); Ryosuke Iguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/844,211

(22) Filed: Sep. 3, 2015

(65) Prior Publication Data
US 2016/0078584 A1    Mar. 17, 2016

(30) Foreign Application Priority Data

Sep. 16, 2014  (JP) ................................. 2014-188253

(51) Int. Cl.
*G06T 3/40*       (2006.01)
*G06T 7/00*       (2006.01)
*G06T 1/00*       (2006.01)

(52) U.S. Cl.
CPC ............. *G06T 7/0002* (2013.01); *G06T 1/005* (2013.01); *G06T 3/4038* (2013.01); *G06T 2201/0065* (2013.01); *G06T 2207/10004* (2013.01)

(58) Field of Classification Search
None
See application file for complete search history.

(56) References Cited

U.S. PATENT DOCUMENTS

| | | | |
|---|---|---|---|
| 4,918,541 A | 4/1990 | Ishida et al. | |
| 5,060,280 A | 10/1991 | Mita et al. | |
| 5,493,415 A | 2/1996 | Mita et al. | |
| 5,680,486 A | 10/1997 | Mita et al. | |
| 5,714,985 A | 2/1998 | Kawamura et al. | |
| 5,848,185 A | 12/1998 | Koga et al. | |
| 5,905,579 A | 5/1999 | Katayama et al. | |
| 6,009,213 A | 12/1999 | Miyake | |
| 6,556,711 B2 | 4/2003 | Koga et al. | |
| 6,661,838 B2 | 12/2003 | Koga et al. | |
| 6,683,957 B1 * | 1/2004 | Shin ................... | H04N 19/172 324/309 |

(Continued)

FOREIGN PATENT DOCUMENTS

| | | |
|---|---|---|
| JP | H09-322059 A | 12/1997 |
| JP | 2003-174556 A | 6/2003 |

*Primary Examiner* — Paul F Payer
(74) *Attorney, Agent, or Firm* — Fitzpatrick, Cella, Harper & Scinto

(57) ABSTRACT

A plurality of images obtained by capturing, dividing over a plurality of times, a printed material in which additional information is embedded are input. Feature information concerning each of the inputted plurality of images is extracted. A poor quality area in the images is evaluated. An overlapping area of the plurality of images is specified based on the feature information. Additional information embedded in the printed material is extracted based on a result of the evaluating and a result of the specifying.

11 Claims, 18 Drawing Sheets

(56) References Cited

U.S. PATENT DOCUMENTS

| | | | |
|---|---|---|---|
| 7,006,668 B2 | 2/2006 | Iguchi et al. | |
| 7,103,214 B2 | 9/2006 | Kusakabe et al. | |
| 7,167,205 B2 | 1/2007 | Akiyama et al. | |
| 7,171,019 B2 * | 1/2007 | Miyake | G06T 1/0071 |
| | | | 358/3.28 |
| 7,177,463 B2 | 2/2007 | Kusakabe et al. | |
| 7,408,680 B2 * | 8/2008 | Miyake | G06T 1/0028 |
| | | | 358/3.28 |
| 7,433,538 B2 | 10/2008 | Kusakabe et al. | |
| 7,634,153 B2 | 12/2009 | Miyake et al. | |
| 7,738,030 B2 | 6/2010 | Akiyama et al. | |
| 8,023,764 B2 | 9/2011 | Miyake et al. | |
| 8,306,357 B2 | 11/2012 | Miyake et al. | |
| 8,600,154 B2 | 12/2013 | Umeda et al. | |
| 8,675,249 B2 | 3/2014 | Umeda et al. | |
| 8,744,209 B2 | 6/2014 | Miyake et al. | |
| 8,929,681 B2 | 1/2015 | Umeda et al. | |
| 9,036,205 B2 | 5/2015 | Umeda et al. | |
| 9,088,753 B2 | 7/2015 | Akiba et al. | |
| 9,171,351 B2 * | 10/2015 | Kita | H04N 5/23232 |
| 9,224,184 B2 * | 12/2015 | Bai | G06T 1/005 |
| 9,386,235 B2 * | 7/2016 | Ma | G06K 9/00624 |
| 2004/0046896 A1 | 3/2004 | Koga et al. | |

\* cited by examiner

FIG. 5
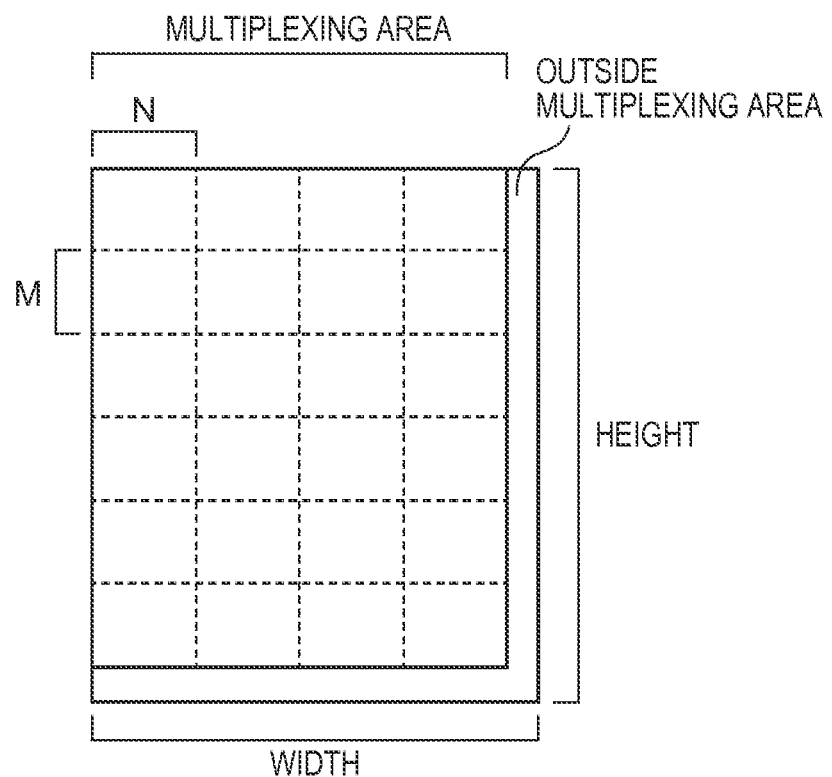
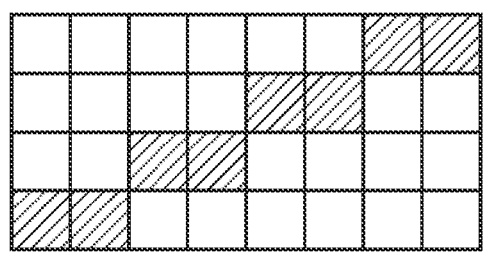
FIG. 6A
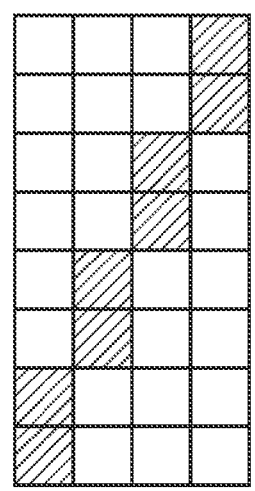
FIG. 6B

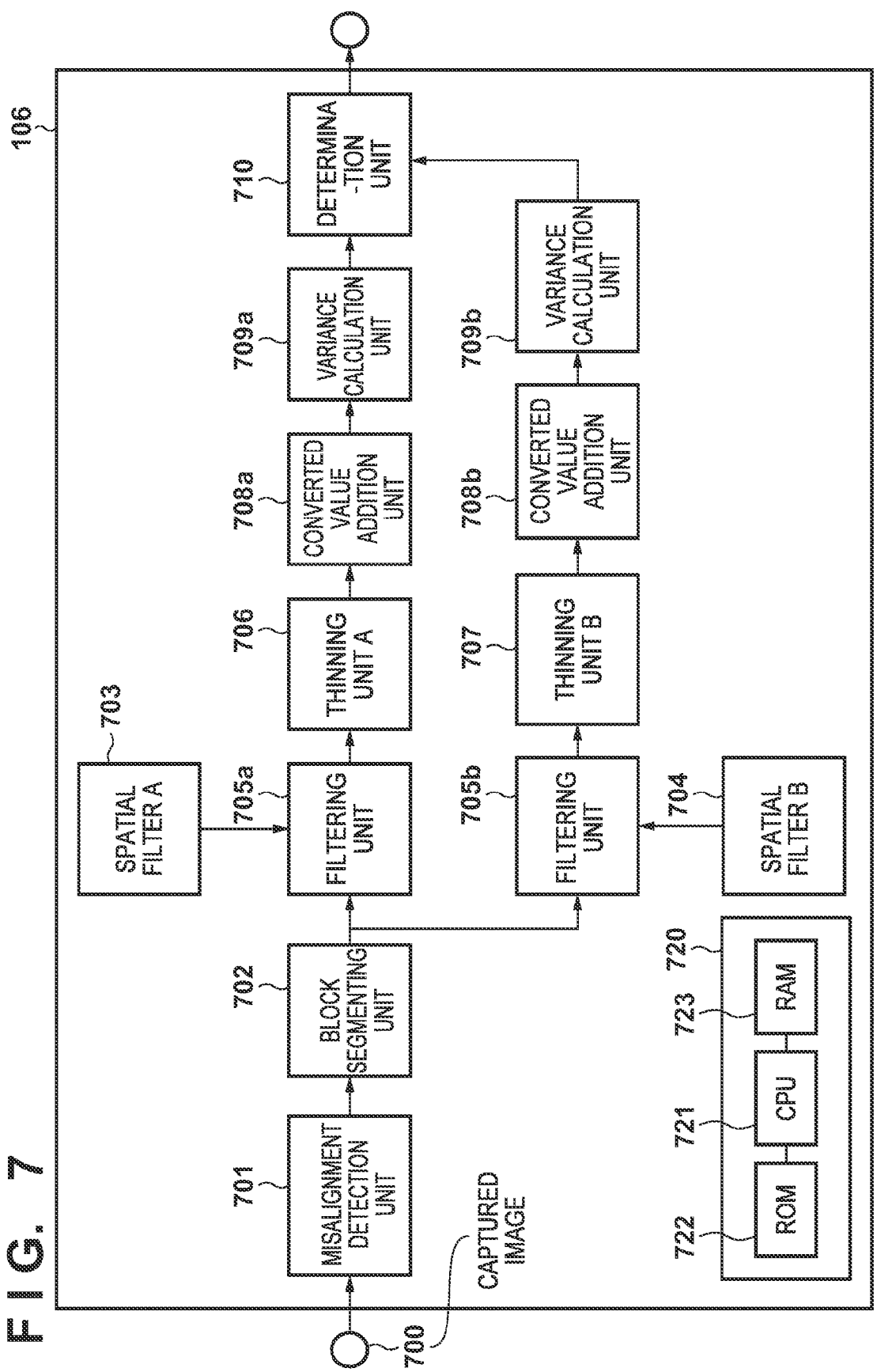

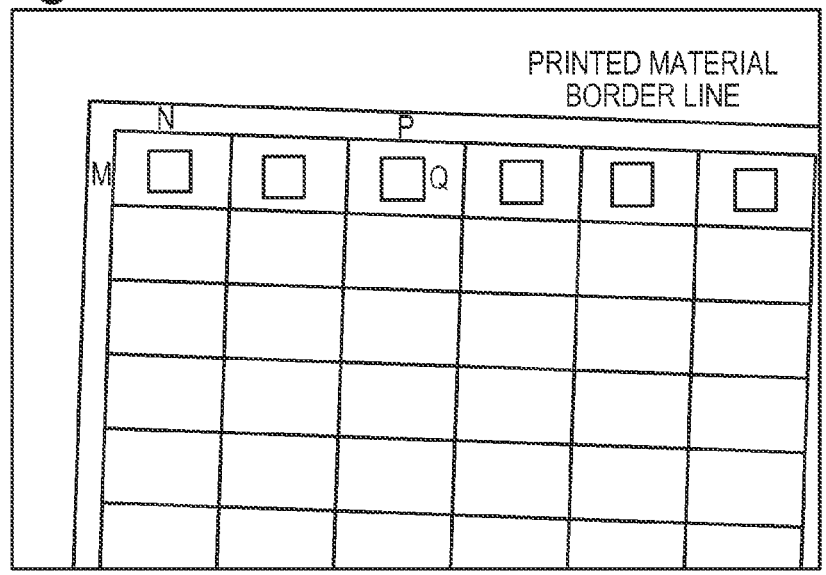
FIG. 8
FIG. 9A
FIG. 9B
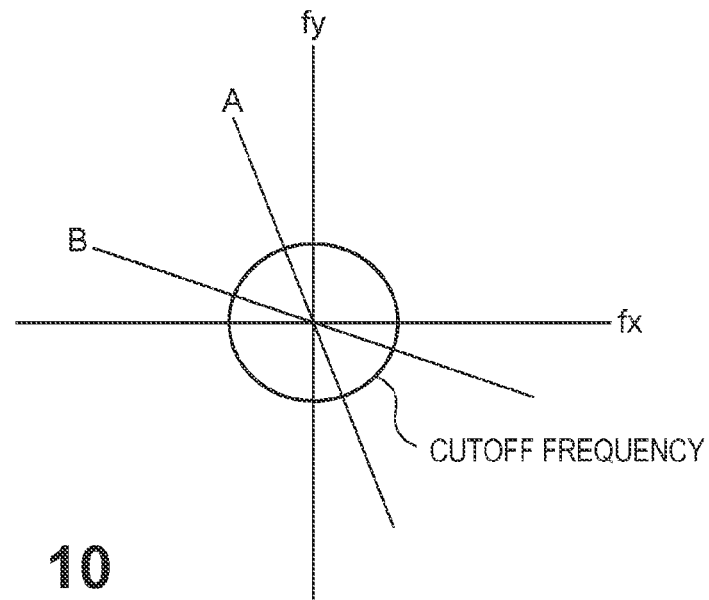
FIG. 10

FIG. 12A

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 12B

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 3 | 2 | 1 | 0 | 3 | 2 | 1 | 0 | 3 | 2 | 1 |
| 1 | 0 | 3 | 2 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 3 | 2 | 1 | 0 | 3 | 2 | 1 | 0 | 3 | 2 | 1 |
| 1 | 0 | 3 | 2 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

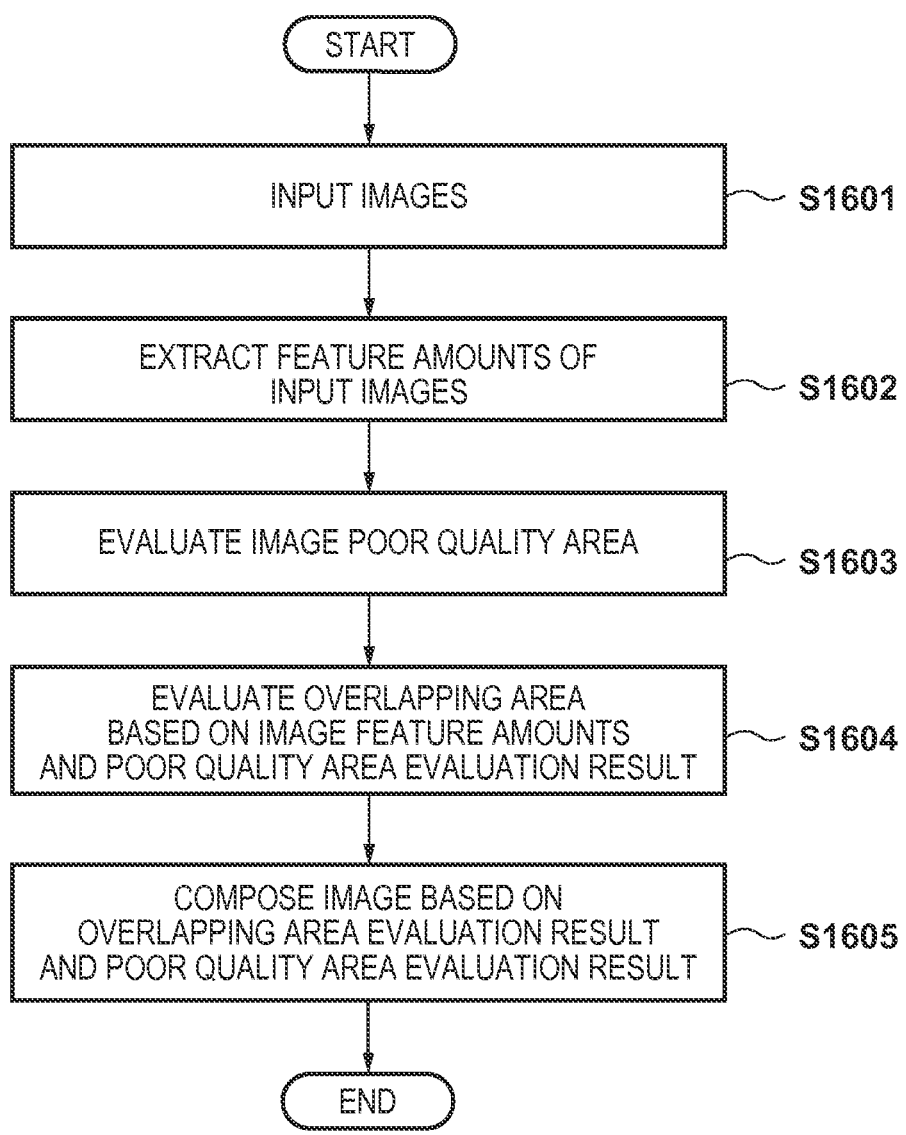

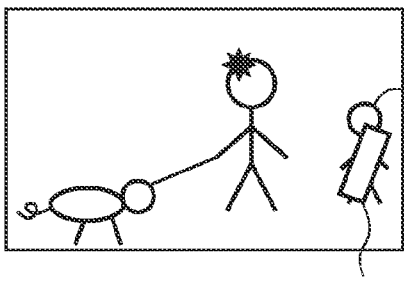 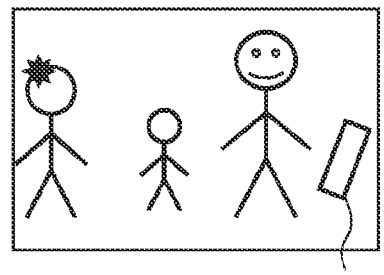
FIG. 16A  FIG. 16B
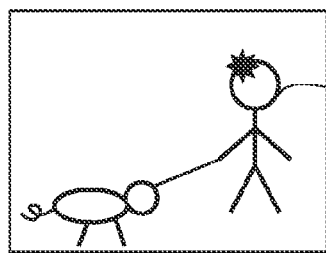 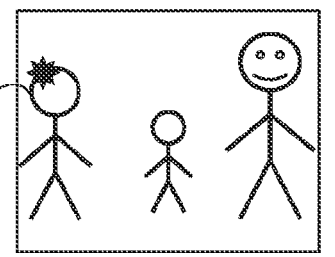
FIG. 16C  FIG. 16D
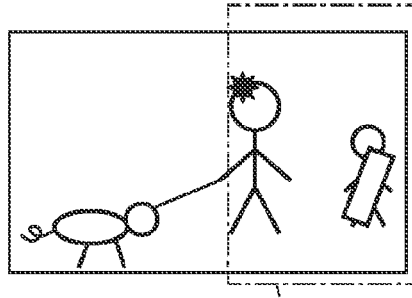 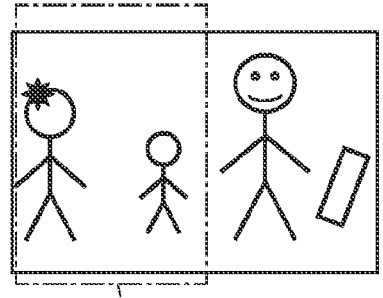
FIG. 16E  FIG. 16F
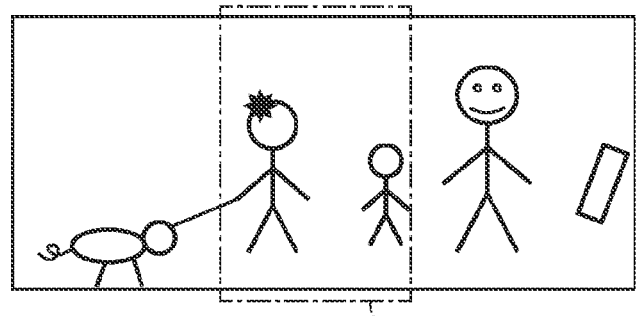
FIG. 16G

FIG. 17
FRONT CAMERA
104
BACK CAMERA
104
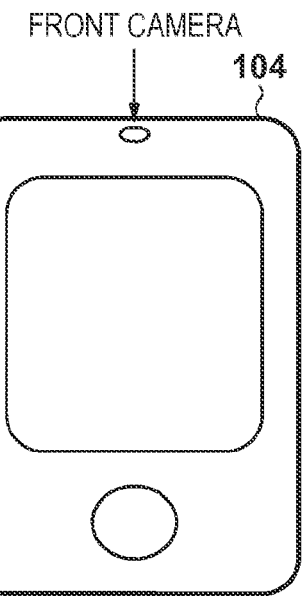
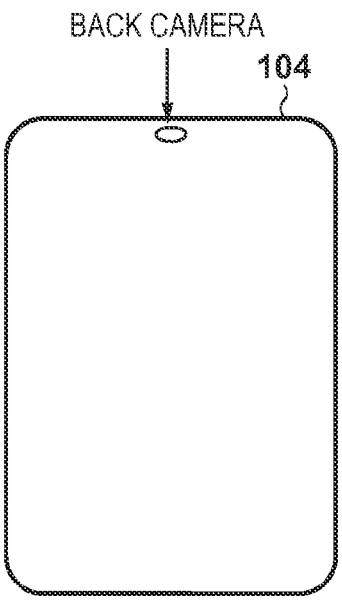
FIG. 18A
FIG. 18B
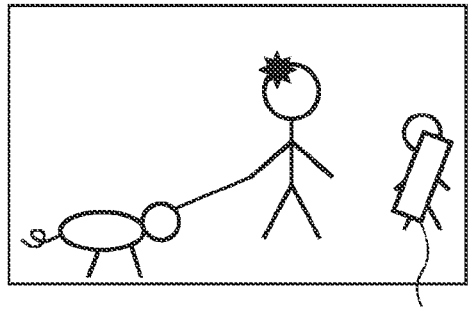
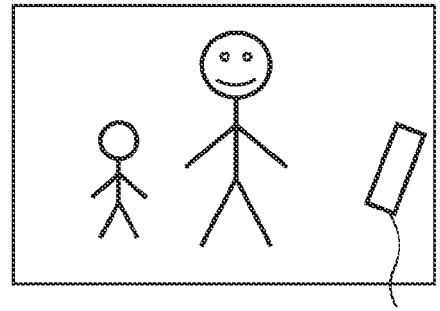
REFLECTION AREA
REFLECTION AREA
FIG. 18C
FIG. 18D
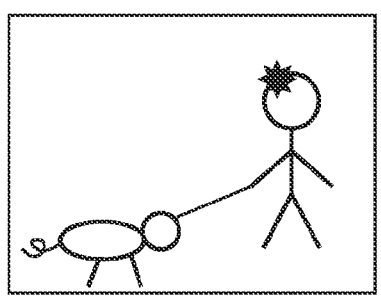
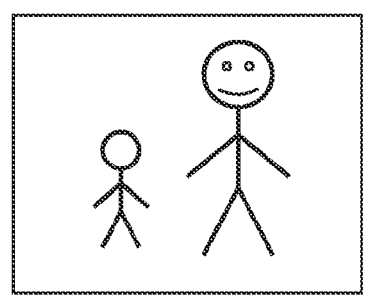

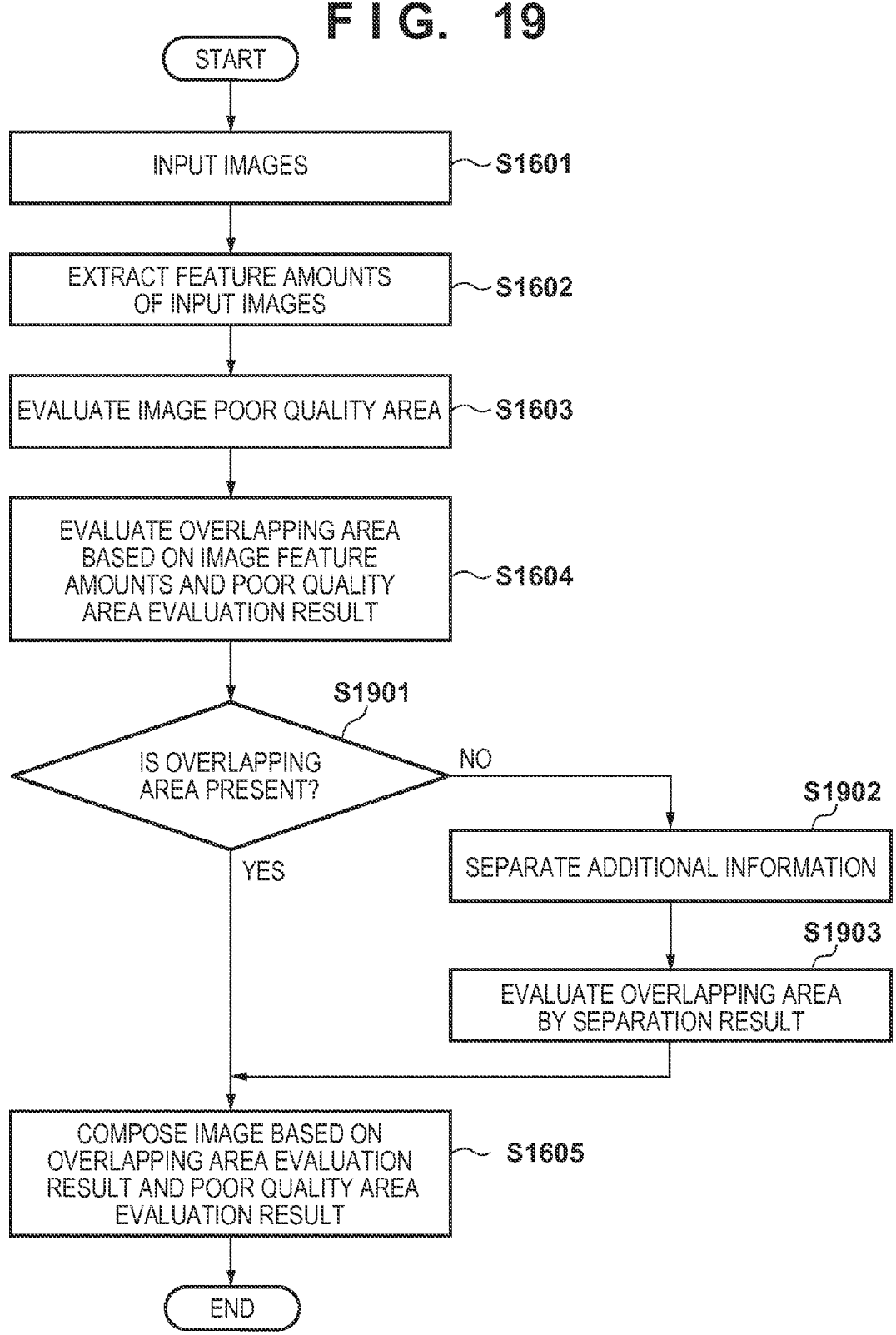

REFLECTION AREA

REFLECTION AREA

OVERLAPPING AREA

OVERLAPPING AREA

OVERLAPPING AREA

IMAGE PROCESSING APPARATUS, IMAGE PROCESSING METHOD, AND NON-TRANSITORY COMPUTER-READABLE STORAGE MEDIUM FOR EXTRACTING INFORMATION EMBEDDED IN A PRINTED MATERIAL

BACKGROUND OF THE INVENTION

Field of the Invention

The present invention relates to a technique for composing images.

Description of the Related Art

Conventionally, a technique for multiplexing additional information of a large capacity such as audio information in a printed material such that it is difficult to distinguish visually has been disclosed (Japanese Patent Laid-Open No. 2003-174556). In recent years, it is becoming possible to obtain additional information of a large capacity that is multiplexed in a printed material by analyzing a composite image after capturing a printed material a plurality of times at a short range while moving a mobile terminal, and composing the plurality of captured images thus obtained.

In this way, a technique for composing a plurality of captured images upon a panorama capturing, for example, has been proposed as an image composing technique for composing a plurality of images (Japanese Patent Laid-Open No. 9-322059).

However, in conventional image composing techniques, a phenomenon of degradation of a captured image due to other objects such as a light source, or the like, being reflected in the printed material in a case where a printed material is captured by a camera is not considered at all.

In the case of capturing with a non-contact device such as a camera, a capturing target is mainly scenery, people, or the like, and it is uncommon that a printed material is the target. Even when a printed material is made to be a target, a continuity evaluation considering what is reflected in the printed material has not been performed. Also, there are cases where a plurality of printed materials are captured by a contact device such as a scanner, and a continuity evaluation is performed on the plurality of captured images. However, because a reflection phenomenon does not occur in capturing on a contact device, a continuity evaluation considering reflection is not performed. In other words, the phenomenon of reflection in a printed material is a completely new problem in image continuity evaluation techniques.

Specifically, there are cases in which if a plurality of printed materials are captured, and a plurality of images thus obtained are composed, a precision of an image composition degrades, or an image composition cannot be performed due to an influence of reflection.

In other words, if a printed material is captured by a camera, the content of the printed material itself cannot be distinguished due to a reflection of a light source, or the like, and the captured image is very degraded. In particular, a sheet having a high glossiness is often used for a high image quality print of a photograph, an album, or the like, but while on one side the appearance of the glossiness is very good, degradation of a captured image due to reflection is large.

In an image composing technique, processing for detecting an overlapping area at which the same/a similar object exists overlappingly in a plurality of images is important. This is, in other words, processing for searching for similar feature amounts among two images. This is a method of detecting the feature amounts of the images by using edge information of the images, for example.

FIG. 23A is an image in which an overlapping area exists in two images. Because the same "person A" exists in two images, it is possible to extract similar feature amounts for "person A".

FIG. 23B illustrates a condition in which a reflection of another object occurs at a portion of an overlapping area "person A" in one of two images in which an overlapping area exists. Originally, the "person A" portion is an area at which edges exist and feature amounts would have been extracted, but because "person A" becomes difficult to recognize due to the reflection, the feature amounts cannot be correctly extracted. Specifically, using conventional methods, due to a reflection included in at least one of a composition target image group, similar feature amounts cannot be extracted from an overlapping area of the images, and this becomes the cause of a reduction in the precision of the image composition. Furthermore, in FIG. 23B, because a common reflection is occurring, composition processing that is not intended by a user is performed if a composition is executed by taking a reflection portion to be an overlapping area.

Accordingly, there are cases in which reflection of another object in the printed material is the cause of degradation of a captured image, and degradation of the precision of the image composition occurs, or the image composition cannot be performed with conventional image compositing techniques that do not consider reflection. Also, because image composition cannot be performed, this leads to not being able to obtain additional information of a large capacity from a printed material.

SUMMARY OF THE INVENTION

The present invention is something that was conceived in order to solve the above described problems, and provides a technique by which it is possible to compose a plurality of images with good precision.

According to the first aspect of the present invention, there is provided an image processing apparatus that extracts additional information embedded in a printed material, the apparatus comprising: an input unit configured to input a plurality of images obtained by capturing, dividing over a plurality of times, a printed material in which additional information is embedded; a unit configured to extract feature information concerning each of the plurality of images input by the input unit; an evaluation unit configured to evaluate a poor quality area in the images; a specifying unit configured to specify an overlapping area of the plurality of images based on the feature information; and an extraction unit configured to extract additional information embedded in the printed material, based on a result of the specifying by the specifying unit and a result of the evaluation by the evaluation unit.

According to the second aspect of the present invention, there is provided an image processing method for extracting additional information embedded in a printed material, the method comprising: inputting a plurality of images obtained by capturing, dividing over a plurality of times, a printed material in which additional information is embedded; extracting feature information concerning each of the inputted plurality of images; evaluating a poor quality area in the images; specifying an overlapping area of the plurality of images based on the feature information; and extracting additional information embedded in the printed material based on a result of the evaluating and a result of the specifying.

According to the third aspect of the present invention, there is provided a non-transitory computer-readable storage medium storing a program for extracting additional information embedded in a printed material, wherein the program causes a computer to input a plurality of images obtained by capturing, dividing over a plurality of times, a printed material in which additional information is embedded; to extract feature information concerning each of the inputted plurality of images; to evaluate a poor quality area in the images; to specify an overlapping area of the plurality of images based on the feature information; and to extract additional information embedded in the printed material based on a result of the evaluating and a result of the specifying.

Further features of the present invention will become apparent from the following description of exemplary embodiments (with reference to the attached drawings).

BRIEF DESCRIPTION OF THE DRAWINGS

FIG. 5 is a view for illustrating an example of a multiplexing area.

FIGS. 6A and 6B are views for illustrating examples of a threshold of a quantization condition.

FIG. 7 is a block diagram for a hardware configuration of a separating apparatus.

FIG. 8 is a view for illustrating an example of a captured image.

FIGS. 9A and 9B are views for illustrating a spatial filter for the separating apparatus.

FIG. 10 is a view for explaining a frequency transformation for the multiplexing area.

FIGS. 12A and 12B are views for explaining a method for thinning pixels.

FIG. 15 is a flowchart for illustrating detail of image composition.

FIGS. 16A-16G are views for explaining a concrete example of image composition.

FIG. 17 is a view for illustrating an example of a mobile terminal comprising two cameras.

FIGS. 18A-18D are views for explaining an example of image composition failure.

FIG. 19 is a flowchart for illustrating detail of image composition.

DESCRIPTION OF THE EMBODIMENTS

Embodiments of the present invention will now be described hereinafter in detail, using the drawings.

Note, the image processing apparatus according to the following embodiment comprises of a multiplexing apparatus which embeds additional information into a printed material, and a separating apparatus which reads the additional information from the printed material. The multiplexing apparatus can be realized by a printer driver or application software within a computer, and can be realized by hardware and software in an image forming apparatus such as a copying machine, a facsimile, or a printer main body. A separating apparatus may be a device provided with an image capture apparatus, such as a camera-equipped mobile terminal, a camera-equipped smartphone, or a tablet PC. Alternatively, the separating apparatus may be a sequence of apparatuses that separate additional information from an image captured by a digital still camera by application software in a computer. The computer is not limited to a desktop type device, and may be any device in which software is operable, such as a notebook PC, smart phone, or tablet PC.

First Embodiment

Figure 1:
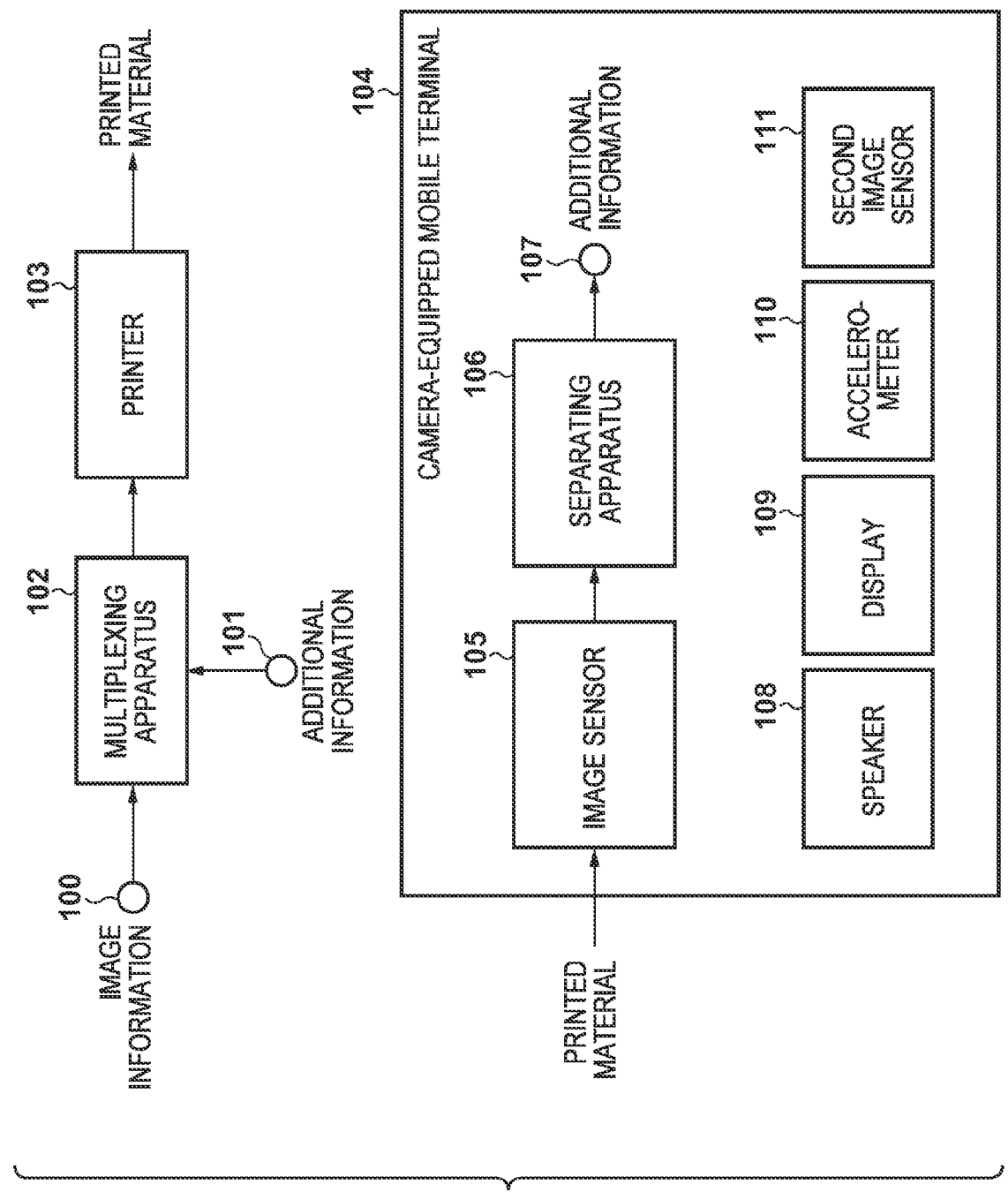
FIG. 1 is a block diagram for illustrating a configuration of an image processing system.

FIG. 1 is a block diagram for illustrating a configuration of an image processing system.

Both of the reference numerals 100 and 101 denote input terminals; multi-tone image information is inputted from the input terminal 100 and additional information which is required to be embedded into the image information is inputted from the input terminal 101. The additional information is information that is different to the image information inputted from the input terminal 100. Various applications can be considered for the additional information such as audio information, moving image information, text document information, a copyright related to an image inputted from the input terminal 100, a captured date and time, a capturing location, information of a photographer, or the like, or completely different image information, for example.

The reference numeral 102 denotes a multiplexing apparatus, which is a device for embedding (multiplexing) additional information into the image information such that it is difficult to distinguish it visually. The multiplexing apparatus 102 quantizes of inputted multi-tone image information along with multiplexing (overlapping) of the additional information.

The reference numeral 103 denotes a printer, which outputs the information created in the multiplexing apparatus 102 by a printer engine. The printer 103 is assumed to be a printer realizing tone representation by using pseudo halftone processing, such as an ink-jet printer or a laser printer.

The information on a printed material generated by the printer 103 is read using an image sensor 105 of a camera-equipped mobile terminal 104. Then, a separating apparatus 106 of the camera-equipped mobile terminal 104 separates the additional information embedded into a printed material, and outputs the additional information to an output terminal 107. The output terminal 107 is an interface for outputting the obtained additional information, for example, and the output terminal 107 outputs to a speaker 108 of the camera-equipped mobile terminal 104 in a case of audio information, and outputs to a display 109 in a case of image information. Also, the output terminal 107 may be an interface for outputting data to an external device.

Note, in a case where a plurality of image sensors including a second image sensor 111 are mounted in the camera-equipped mobile terminal 104, the second image sensor 111 may also be employed in capturing of a printed material. Also, the configuration is taken so that the separating apparatus 106 is incorporated in the camera-equipped mobile terminal 104 in FIG. 1, but the separating apparatus 106 may be realized as an apparatus separate from the camera-equipped mobile terminal 104.

Figure 2:
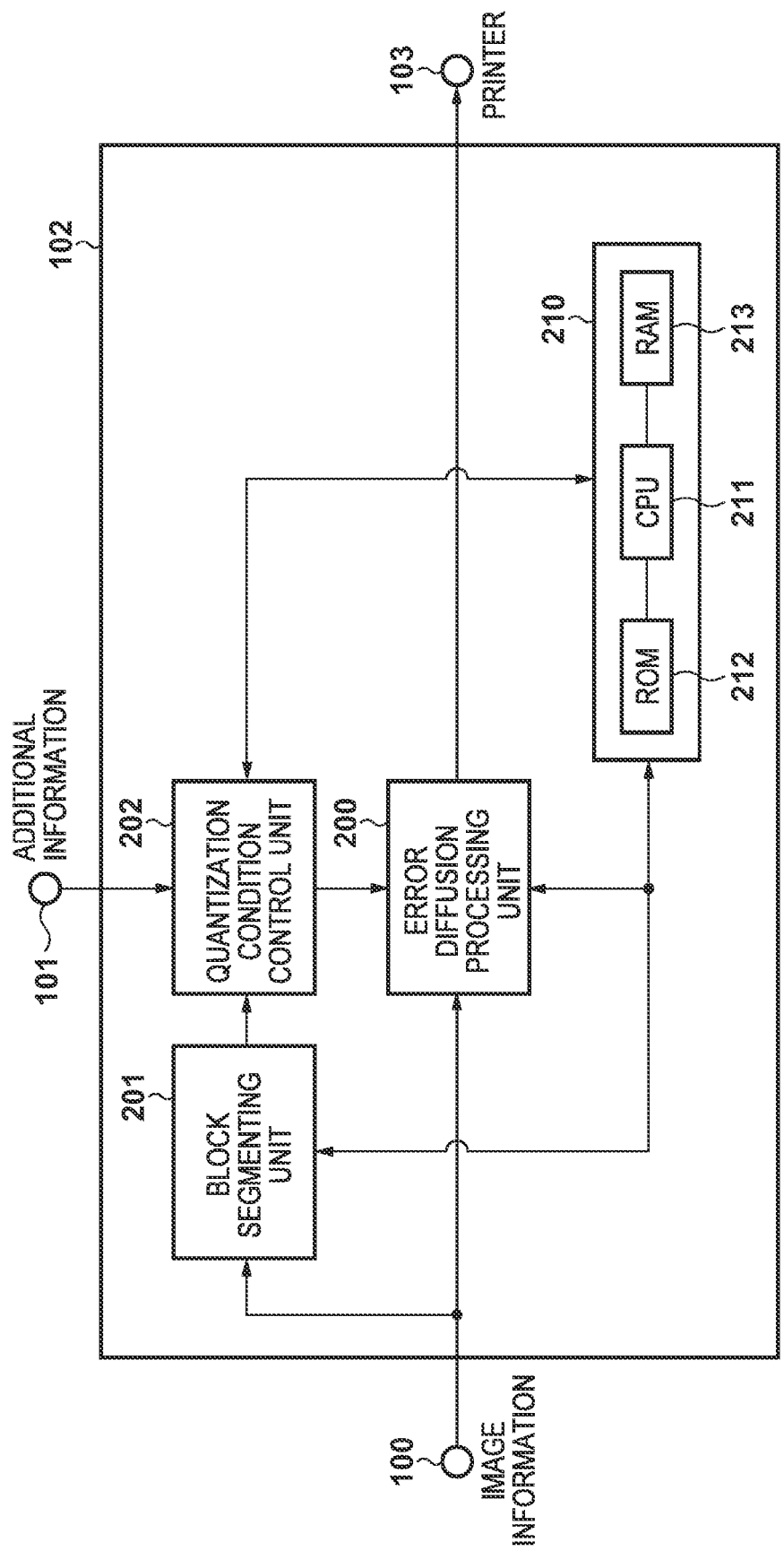
FIG. 2 is a block diagram for illustrating a hardware configuration of a multiplexing apparatus.

FIG. 2 is a block diagram for illustrating a hardware configuration of the multiplexing apparatus 102 of FIG. 1.

The reference numeral 200 denotes an error diffusion processing unit, which converts the image information inputted from the input terminal 100 to a quantization level less than an input tonal number by performing pseudo halftone processing by an error diffusion method, and expresses tone characteristics in terms of area using quantization values of multiple pixels. Details regarding the error diffusion processing are explained later.

The reference numeral 201 denotes a block segmenting unit, which performs block segmenting which segments the inputted image information into units of a predetermined area (e.g. block units). Block segmenting performed by the block segmenting unit 201 may use rectangles, or the segmenting may be performed using areas other than rectangles. Configuration may also be taken such that inside an image, the size of the rectangles changes.

The reference numeral 202 denotes a quantization condition control unit, which changes and controls a quantization condition by the predetermined area units that are block segmented in the block segmenting unit 201. The quantization condition control unit 202 controls the quantization condition in units of blocks based on the additional information inputted from the input terminal 101.

The reference numeral 210 is a controlling unit comprising a CPU 211, a ROM 212, and a RAM 213. The CPU 211 controls operation and processing of various elements of the multiplexing apparatus 102 according to a control program held in the ROM 212. The RAM 213 is used as a work area for the CPU 211.

Figure 3:
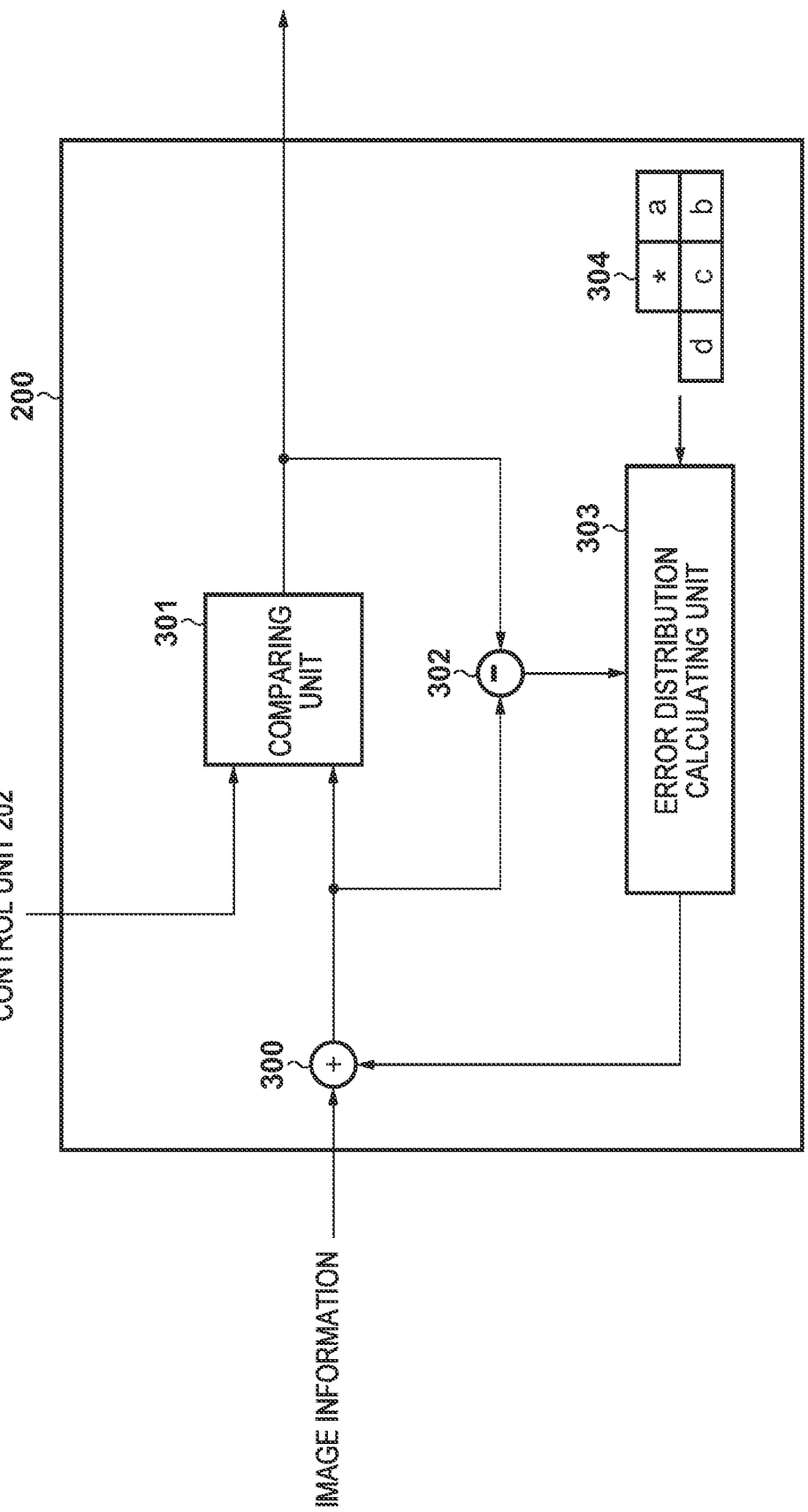
FIG. 3 is a block diagram for illustrating a detailed configuration of an error diffusion processing unit.

FIG. 3 is a block diagram for illustrating a detailed configuration of the error diffusion processing unit 200. Here, explanation is given of an example of error diffusion processing in which a quantization value is binary.

The reference numeral 300 denotes an adder, which adds a target pixel value for inputted image information to a quantization error distributed among peripheral pixels that are already binarized. A quantization threshold from the quantization condition control unit 202 and an addition result for an added error are compared by a comparing unit 301, and when the addition result is larger than the predetermined threshold "1" is output; otherwise "0" is output. For example, when expressing a tone for a pixel by using a precision of eight bits, it is typical to express by using a maximum value of "255" and a minimum value of "0". Here, when the quantization value is "1", a dot (ink, toner, or the like) is printed on a recording medium. The reference numeral 302 indicates a subtractor, which calculates an error between the quantization result and the addition result from the adder 300, and then distributes the error to peripheral pixels to which further quantization processing is to be applied based on an error distribution calculating unit 303.

For an error distribution ratio, a distribution table 304 is held in advance for an error set experimentally based on a relative distance to a pixel of interest, and the error is distributed based on a distribution ratio set in the distribution table 304. The distribution table 304 of FIG. 3 shows a distribution table for a peripheral four pixels, but is not limited to this.

Figure 4:
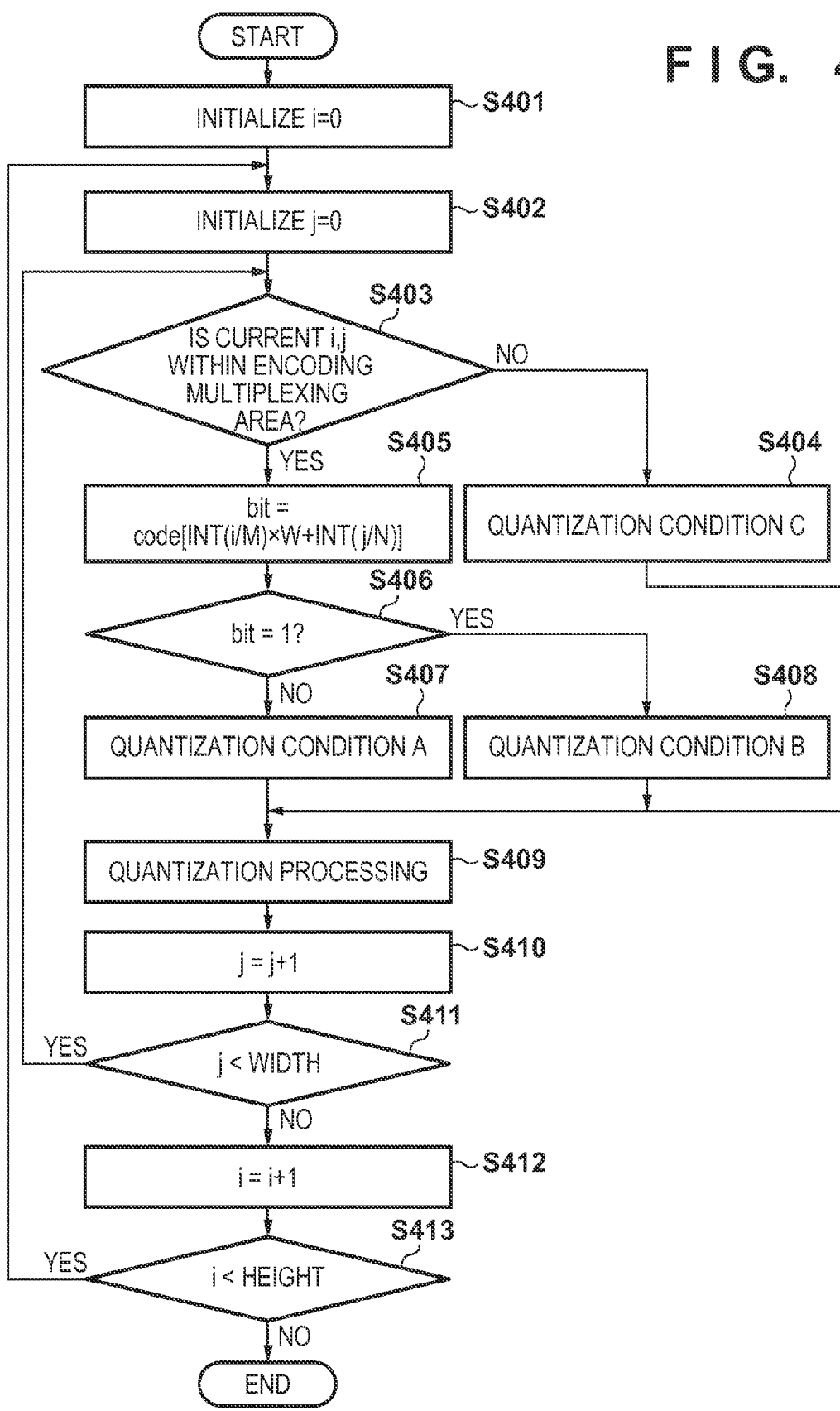
FIG. 4 is a flowchart for illustrating processing executed by the multiplexing apparatus.

Next, using the flowchart of FIG. 4, explanation is given regarding a basic operational procedure of the whole which includes the quantization condition control unit 202. Here, explanation is given of an example where the quantization value is binary. Note that the processing shown in FIG. 4 is realized by the CPU 211 of the multiplexing apparatus 102 executing a control program stored in the ROM 212.

In step S401, the multiplexing apparatus 102 initializes a variable i (i=0). The variable i is a variable for counting an address in a vertical (portrait) direction of an image to be processed. In step S402, the multiplexing apparatus 102 initializes a variable j (j=0). The variable j is a variable for counting an address in a horizontal (landscape) direction of an image to be processed. In step S403, the multiplexing apparatus 102 executes a determination by using address values of (i, j). More specifically, it is determined whether coordinates (i, j) (a target pixel to be processed), which are the current processing addresses is in an area (a multiplexing area) for which a multiplexing process should be executed.

Explanation is given using FIG. 5 regarding the multiplexing area. FIG. 5 shows one image, comprised of a horizontal number of pixels WIDTH and a vertical number of pixels HEIGHT. Now, multiplexing the additional information to within the image is assumed. Configuration is made to take the top left of the image as an origin point, and block segmenting is performed in units of N×M pixels, in which there are N horizontal pixels and M vertical pixels. Here block segmenting is performed by using the origin point (the top-left corner of the image) as a reference point, but setting may be performed to use a point separated from the origin point as the reference point. When multiplexing a maximum amount of information in the image, N×M blocks are arranged from the reference point. In other words, when a number of blocks that can be arranged in the horizontal direction is W and a number of blocks that can be arranged in the vertical direction is H, the following relationship is configured.

$$W = \text{INT}(\text{WIDTH}/N) \quad (1)$$

$$H = \text{INT}(\text{HEIGHT}/M) \quad (2)$$

Note that INT( ) indicates an integer part of what is inside the parentheses.

A remainder number of pixels that cannot be divided in the formulas (1), (2) corresponds to an end portion when a plurality of N×M blocks are arranged, and the end portion is outside the multiplexing area.

In step S403, when the target pixel is not in the multiplexing area (NO in step S403), in step S404 the multiplexing apparatus 102 sets a quantization condition C. In contrast, when the target pixel is in the multiplexing area, (YES in step S404), in step S405 the multiplexing apparatus 102 reads additional information that is to be multiplexed. Here, for ease of the explanation, it is assumed that the additional information uses an array called code[ ] to express each single bit. For example, assuming that the additional information is 48 bits of information, the array code[ ] stores each single bit from code[0] to code[47].

Note that, in step S405, the additional information is read by assigning information in the array code[ ] for a variable bit, as follows.

$$\text{bit}=\text{code}[\text{INT}(i/M)\times W+\text{INT}(j/N)] \qquad (3)$$

In step S406, the multiplexing apparatus 102 determines whether the assigned variable bit is "1" (bit=1). Because information in the array code[ ] stores each one bit, this shows that the value of the variable bit is either of "0" or "1". When the variable bit is "0" (NO in step S406), in step S407 the multiplexing apparatus 102 sets the quantization condition A. However, when the variable bit is "1" (YES in step S406), in step S408 the multiplexing apparatus 102 sets the quantization condition B.

In step S409, the multiplexing apparatus 102 performs quantization processing based on the set quantization condition. The quantization processing corresponds to the error diffusion method explained in FIG. 3. In step S410, the multiplexing apparatus 102 increments the horizontal direction variable j (increments by 1). In step S411, the multiplexing apparatus 102 determines whether the horizontal direction variable j, which is the number of processed pixels, is less than WIDTH, which is the horizontal number of pixels for the image (j<WIDTH). If the number of processed pixels is less than WIDTH (YES in step S411), the processing returns to step S403, and the processing from step S403 to step S410 is repeated thereafter until the number of processed pixels becomes greater than or equal to WIDTH.

However, if the number of processed pixels is greater than or equal to WIDTH (NO in step S411), in step S412 the multiplexing apparatus 102 increments the vertical direction variable i (increments by 1). In step S413, the multiplexing apparatus 102 determines whether the vertical direction variable i, which is the number of processed pixels, is less than HEIGHT, which is the vertical number of pixels for the image. If the number of processed pixels is less than HEIGHT (YES in step S413), the processing returns to step S402, and the processing from step S402 to step S412 is repeated thereafter until the number of processed pixels becomes greater than or equal to HEIGHT. If the number of processed pixels is greater than or equal to HEIGHT (NO in step S413), the processing terminates.

Through the above operational procedure, it is possible to change the quantization condition by a block unit comprised of N×M pixels.

Explanation is given of examples of the quantization conditions A, B and C. There are various factors for a quantization condition in the error diffusion method, but here it is assumed that the quantization condition is a quantization threshold. Usage of the quantization condition C is outside the multiplexing area, so the quantization threshold may be anything. As described above, when a quantization level is binary and a tone representation is made by eight bits for one pixel, a maximum of "255" and a minimum of "0" are quantization representative values, but an intermediate value therebetween of "128" is often set as the quantization threshold. In other words, the quantization condition C is a condition that fixes the quantization threshold to "128".

The quantization condition A and the quantization condition B are used in a block (a multiplexing block) in the multiplexing area, so differences in image quality due to different quantization conditions must be generated. However, differences in image quality must be expressed so as to be difficult to distinguish visually, and such that one cannot distinguish them easily from printed material.

FIG. 6A and FIG. 6B are examples of the quantization condition A and the quantization condition B. FIG. 6A shows a period of a change to the quantization threshold in the quantization condition A. In the drawing, it is assumed that one cell is a portion for one pixel, a fixed threshold is set for white cells, and a variable threshold is set for hatched cells. In other words, in the example of FIG. 6A, a matrix of eight horizontal pixels and four vertical pixels is assembled, and only thresholds for hatched cells are set as thresholds with protruding values.

FIG. 6B shows a period of a change to the quantization threshold in the quantization condition B. In other words, in the example of FIG. 6B, unlike FIG. 6A, a matrix of eight vertical pixels and four horizontal pixels is assembled, and only thresholds for hatched cells are set as thresholds with protruding values.

Here, when one pixel is an eight bit tonal value, as an example, "128" is set as the fixed threshold, and "10" is set as a protruding threshold. When the quantization threshold becomes low, it is easier for the quantization value of the target pixel to become "1" (quantization representative value "255"). In other words, in both FIG. 6A and FIG. 6B, it becomes easier to line up the quantization value "1" in the ordering of the hatched cells in the drawings. In other words, for each block of N×M pixels, blocks in which dots occur within the order of the hatched cells of FIG. 6A, are mixed with blocks in which dots occur within the order of the hatched cells of FIG. 6B.

A certain amount of change for the quantization threshold in the error diffusion method does not have a large effect with respect to image quality. In an ordered dither method, image quality of tone representation is largely governed by a used dither pattern. However, with an error diffusion method that regularly applies a change for a quantization threshold, because a tone representation that determines image quality is an error diffusion method, changing the order of dots somewhat, changing the occurrence of a texture, or the like, for the most part does not have an influence on the image quality of tone representation. Even if the quantization threshold is changed, because an error that is a difference between a signal value and the quantization value is distributed to surrounding pixels, an inputted signal value is saved in a macro sense. In other words, regarding generation of a texture or an order of dots in an error diffusion method, redundancy becomes very large.

Incidentally, in the above explanation, multiplexing is realized by overlapping a predetermined periodicity representing a code for a quantization threshold of the error diffusion method, but the following schemes can also be considered.

A scheme of directly overlapping a periodicity to RGB luminance information

A scheme of multiplexing a periodicity after separating RGB luminance information into luminance-color difference information (for example, Y, Cr, Cb signals)

A scheme of multiplexing a periodicity after separating RGB luminance information into ink colors (for example, CMYK signals)

<Separating Apparatus>

Next, explanation is given for the separating apparatus 106 in the image processing system of FIG. 1.

FIG. 7 is a block diagram for illustrating a hardware configuration of the separating apparatus 106 of FIG. 1. To simplify the explanation, similarly to the example of the multiplexing apparatus 102, explanation is given for an example of separating additional information from printed material to which each bit of the additional information is multiplexed in divided blocks. In such a case, the amount of additional information in one block in the multiplexing apparatus 102 and the amount of separated information in one block in the separating apparatus 106 are equal.

The reference numeral 700 denotes an input terminal, which inputs image information read via the image sensor 105 of the camera-equipped mobile terminal 104. It is possible to configure the resolution of the image sensor 105 used to be equivalent or exceeding the resolution of the printer 103 that generates the printed material. Note that in order to accurately read dot scatter information of the printed material, the image sensor 105 needs a resolution two or more times that of the printer 103, under sampling theory. However, if the resolution of the image sensor 105 is equivalent or exceeding the resolution of the printer 103, even if not accurate, it is possible to identify that dots are scattered to a certain extent. Here, to simplify the explanation, it is assumed that the resolution of the printer 103 is the same resolution as the resolution of the image sensor 105.

The reference number 701 denotes a misalignment detection unit, which detects a geometrical misalignment of an image captured by the image sensor 105 of the camera-equipped mobile terminal 104. Because image information input from the input terminal 700 passes being output from the printer 103 and being captured by the camera-equipped mobile terminal 104, it may be largely geometrically misaligned with respect to the image information before being output from the printer 103. Accordingly, the misalignment detection unit 701 detects from the image information a boundary line between the printed material and outside of the printed material through edge detection.

FIG. 8 is a view for illustrating an example of a captured image. Here, when the resolution of each of the printer 103 and the image sensor 105 is the same, a major cause for a need to correct a rotation direction (a tilt) of a captured image is due to skew of a recording medium at a time of printing by the printer 103, a misalignment at a time of capturing the printed material by the image sensor 105, or the like. Therefore, by detecting a boundary line of the printed material from the captured image, it is possible to determine to what extent a misalignment has occurred due to the rotation direction.

The reference numeral 702 denotes a block segmenting unit, which block segments in P×Q pixel units of P horizontal pixels and Q vertical pixels. The blocks must be smaller than the N×M blocks in the block segmenting at the time of overlapping the additional information. In other words, following relationship is established, $$P \leq N, \text{ and } Q \leq M \quad (4)$$

For the block segmenting of P×Q pixel units, block segmenting is performed by skipping each fixed interval (a fixed number of pixels). In other words, block segmenting is performed so that one block of P×Q pixel units is contained in an area envisioned as blocks of N×M pixel units at a time of multiplexing. For a skipped number of pixels, a horizontal portion of N pixels and a vertical portion of M pixels are a basis, but it is necessary to correct by using a number of blocks to identify an amount of misalignment detected by the misalignment detection unit 701, calculating the amount of misalignment per block, and adding this to the skipped number of pixels.

The reference numbers 703 and 704 respectively indicate spatial filters A and B, which have characteristics different to each other. The reference numerals 705a and 705b denote filtering units that perform digital filtering by respectively using the spatial filter A 703 and the spatial filter B 704 to calculate a sum of products with respect to peripheral pixels. The respective filter coefficients for the spatial filter A 703 and the spatial filter B 704 are generated suitably for the periods of the variable thresholds of the quantization conditions at the time of multiplexing.

Here, it is assumed that the additional information is multiplexed by using the two kinds of periodicity of FIG. 6A and FIG. 6B in a change to the quantization condition in the multiplexing apparatus 102. Examples of the spatial filter A 703 and the spatial filter B 704 used in the separating apparatus 106 at this point are respectively shown in FIG. 9A and FIG. 9B. In the drawings, a central portion of 5×5 pixels is the pixel of interest, and the other 24 pixel portions are the peripheral pixels. In the drawings, a blank portion pixel represents that the filter coefficient is "0". As is apparent from the figures, FIG. 9A and FIG. 9B are edge enhancement filters. Moreover, directionality for an edge to be emphasized and directionality for a variable threshold at the time of multiplexing match. In other words, generation is performed so that FIG. 9A matches the periodicity of FIG. 6A, and FIG. 9B matches the periodicity of FIG. 6B.

The reference numbers 706 and 707 respectively denote a thinning unit A and a thinning unit B, which execute thinning-out processing to thin out pixels based on a regularity, with respect to a signal (hereinafter, referred to as a converted value) that has been filtered in a block of P×Q pixels. Here, processing is performed having separated the regularity of the thinning for a periodicity and a phase. In other words, the periodicity of thinning differs for the thinning unit A 706 and the thinning unit B 707, and each executes a plurality of thinning-out processes that change the phase. A method of thinning is explained later.

The reference numerals 708a and 708b are converted value addition units, which execute an addition process to add up converted values respectively thinned by the thinning unit A 706 and the thinning unit B 707 for each respective phase. The thinning processing and converted value addition processing corresponds to extracting a power for a predetermined frequency vector emphasized by each of the spatial filter A 703 and the spatial filter B 704.

The reference numerals 709a and 709b denote variance calculation units, which calculate a variance for a plurality of add-up values added up for each phase in respective periodicities. The reference numeral 710 denotes a determination unit, which determines a multiplexed code based on a variance value in periodicity calculated by each of the variance calculation units 709a and 709b.

The reference numeral 720 denotes a control unit that has a CPU 721, a ROM 722, and a RAM 723. The CPU 721 controls operations and processing for various elements of the separating apparatus 106 in accordance with a control program held in the ROM 722. The RAM 723 is used as a work area for the CPU 721.

FIG. 10 is a view for explaining a frequency transformation for the multiplexing area (a two-dimensional frequency domain) of the additional information. The abscissa axis indicates a frequency fx in the horizontal direction, and the ordinate axis denotes a frequency fy in the vertical direction. The origin point at the center indicates a direct current component, and as the distance from the origin point increases, the frequency becomes higher. A circle in the drawing indicates a cut-off frequency according to error diffusion. Filter characteristics of the error diffusion method indicate characteristics of an HPF (high pass filter) that cuts-off a low frequency region, and the cut-off frequency is changed depending on a density of the target image.

Here, a frequency characteristic that occurs after quantization is changed by changing the quantization threshold. Through changes to the quantization threshold according to FIG. 6A, a large power spectrum occurs on the frequency vector A of FIG. 10. Also, through changes to the quantization threshold according to FIG. 6B, a large power spectrum occurs on the frequency vector B of FIG. 10. At a time of separation, by detecting a frequency vector for which a large power spectrum occurs, it is possible to determine a multiplexed signal. Accordingly, it is necessary to individually enhance and extract each frequency vector.

FIG. 9A and FIG. 9B correspond to HPFs having directionality for a specific frequency vector. In other words, it is possible for the spatial filter A of FIG. 9A to emphasize the frequency vector on a line A. Also, it is possible for the spatial filter B of FIG. 9B to emphasize the frequency vector on a straight line B. For example, it is assumed that through a change to the quantization condition according to FIG. 6A, a large power spectrum occurs on the frequency vector A of FIG. 10. At that point, although the amount of change for the power spectrum is amplified through the spatial filter A of FIG. 9A, it is mostly not amplified through the spatial filter B of FIG. 9B. In other words, when filtering with a plurality of spatial filters in parallel, because amplification only occurs when a frequency vector matches a spatial filter, and there is mostly no amplification for other filters, it is easy to discern that a large power spectrum occurs on a particular frequency vector.

Figure 11:
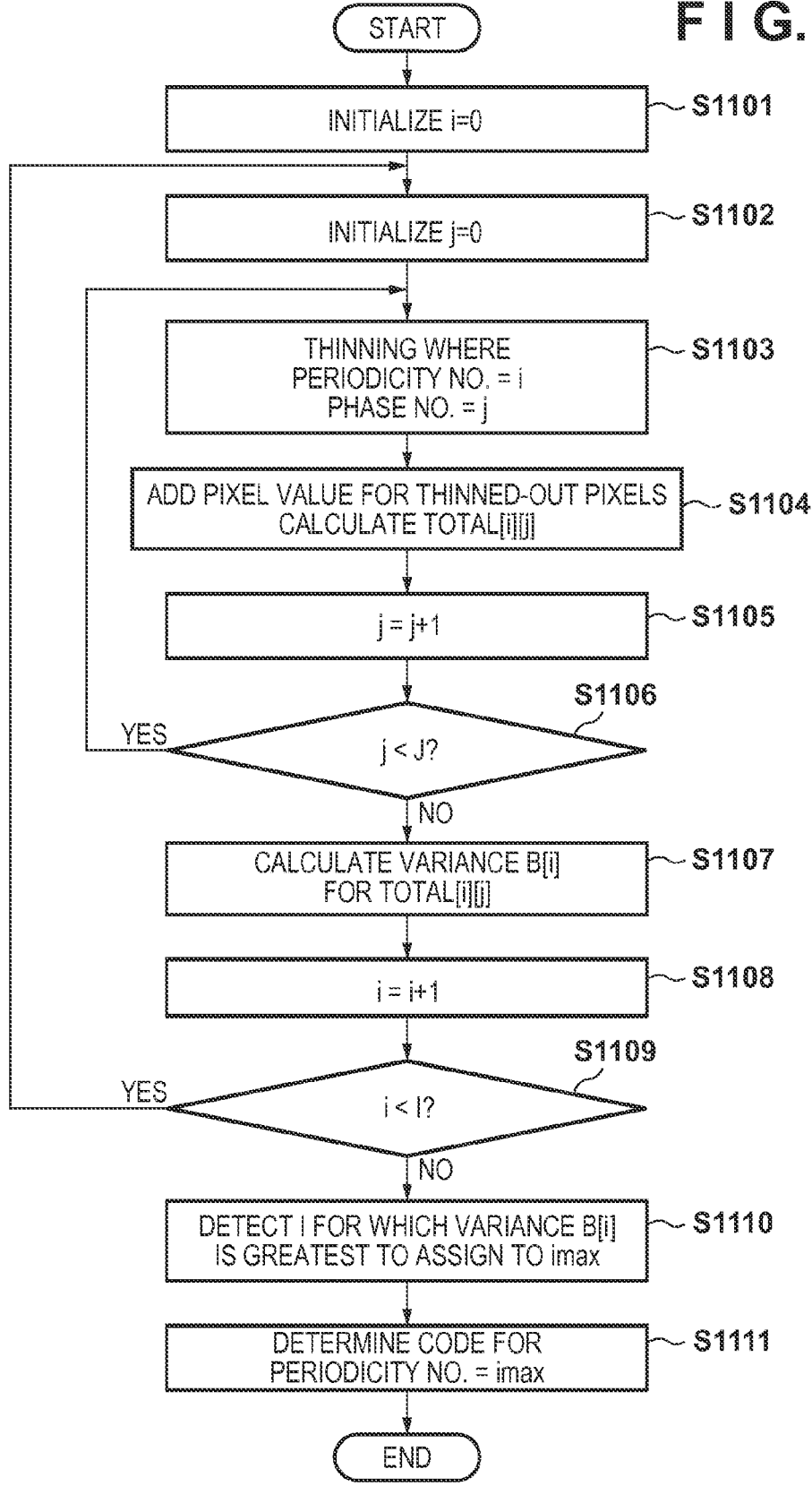
FIG. 11 is a flowchart for illustrating processing executed by the separating apparatus.

FIG. 11 is a flowchart for illustrating processing executed by the separating apparatus 106 of FIG. 7. The processing includes operation of the thinning unit A 706 and the thinning unit B 707, the converted value addition units 708a and 708b, the variance calculation units 709a and 709b and the determination unit 710 in the separating apparatus 106. Note that the processing shown in FIG. 11 is realized by the CPU 721 of the separating apparatus 106 executing a control program stored in the ROM 722.

In step S1101, the separating apparatus 106 initializes a variable i (i=0). The variable i is a variable related to periodicity. In step S1102, the separating apparatus 106 initializes a variable j (j=0). The variable j is a variable related to phase. In step S1103, the separating apparatus 106 determines factors for the regularity of thinning according to the thinning unit A 706 and the thinning unit B 707, in other words, two factors: "periodicity" and "phase". Conditions for the periodicity and phase are managed by a number (No.), and currently factors of the thinning method are set: the periodicity No. is "i", and the phase No. is "j".

In step S1104, the separating apparatus 106 adds up converted values (a pixel value of a thinned pixel) in a block by converted value addition units 708a and 708b, and an add-up value that was added up is stored as an array TOTAL[i][j] which is a variable. In step S1105, the separating apparatus 106 increments the variable j (increments by 1). In step S1106, the separating apparatus 106 compares the variable j and the fixed value J, and determines whether the variable j is less than the fixed value J. Here, the fixed value J indicates a number of times thinning-out processing that changes the phase is executed. As a result of the determination, if the variable j is less than the fixed value J (YES in step S1106), the processing returns to step S1103, a condition for a new phase No. according to an incremented variable j is used to then execute the thinning-out processing and the converted value (thinned pixel value) addition processing.

In contrast, when the variable j is greater than or equal to the fixed value J (NO in step S1106), in other words, in a case where a number of times of setting thinning-out processing and addition process for a shifted phase (a number of times that the fixed value J indicates) has completed, in step S1107 the separating apparatus 106 calculates a variance B[i] of TOTAL[i][j], which are the addition results, by using the variance calculation units 709a and 709b. In other words, to what extent each the addition result varies due to a difference of phase is evaluated. Here, the value of i is fixed, and J variance B[i]s of TOTAL[i][j] are calculated.

In step S1108, the separating apparatus 106 increments variable i (increments by 1). In step S1109, the separating apparatus 106 compares the variable i and the fixed value I, and determines whether the variable i is less than the fixed value I. Here, the fixed value I indicates a number of times thinning-out processing that changes the periodicity is executed. As a result of the determination, if the variable i is less than the fixed value I (YES in step S1109), the processing returns to step S1102, a condition for a new periodicity No. according to an incremented variable i is used to then execute thinning-out processing and the converted value (thinned-out pixel value) addition processing.

In step S1109, when the variable i is greater than or equal to the fixed value I (NO in step S1109), in other words, in a case where a number of times of setting thinning-out processing and addition processing for a shifted periodicity (a number of times indicating the fixed value I) has completed, I variance B[i]s are calculated. In step S1110, the separating apparatus 106 detects a maximum value of the variance values from the collection of I variance B[i]s, and the value of i at that point is assigned to the variable imax. In step S1111, the separating apparatus 106 determines through the determination unit 710 that, as a result of determining the encoding, the code for which the periodicity No. is the variable imax is the multiplexed code (additional information), and then terminates.

Here, explanation is given for a processing example for the separating apparatus 106 in which 1=2 and J=4. FIG. 12A and FIG. 12B use a table format to indicate a thinning method when the block size is set as P=Q=16. In the drawings, one cell in a block represents one pixel. The block shape in the figures is a square with P=Q, but the block shape is not limited to a square, and may be other than a rectangle.

FIG. 12A indicates a thinning method when the periodicity No.=0 (corresponding to the thinning unit A 706 in FIG. 11), and FIG. 12B indicates a thinning method when the periodicity No.=1 (corresponding to the thinning unit B 707 of FIG. 11). In the drawings, the value shown in each pixel in a block indicates a thinned pixel for j which is the phase No. For example, a pixel displayed as "0" corresponds to a thinned pixel when j=0. In other words, in both FIG. 12A and FIG. 12B, there are four kinds of phase, and these correspond to the thinning method when the phase No. j is 0-3.

The periodicity shown in FIG. 12A and FIG. 12B respectively matches the periodicity of FIG. 6A and FIG. 6B. As with FIG. 6A and FIG. 6B, in the ordering of hatched cells, the quantization value "1" (note that this is the case of two values "0" and "1") is easier to line up. Therefore, for example, in a case of a block that uses the quantization condition A at a time of multiplexing, by the periodicity of FIG. 12A, the quantization value "1" tends to line up. When a spatial filter is adapted, its frequency component is further amplified, and by the periodicity of FIG. 12A, when the converted values (the pixel values after filtering) are added up, the variance of the addition result thereof becomes large.

In comparison, in a case of filtering a block that uses the quantization condition A by using an unadapted spatial filter and also thinning via the periodicity of FIG. 12B, the variance value of the addition result for the converted values becomes small. This is because an add-up value for the converted values due to differences in the thinning phase becomes average, and variation becomes small, as the periodicity of the quantization value differs to the periodicity of thinning. Conversely, for a block that uses the quantization condition B at a time of multiplexing, the variance value decreases with the thinning of FIG. 12A, and the variance value increases with the thinning of FIG. 12B.

In the example of the flowchart of FIG. 4, because bit=0 is set as the quantization condition A and bit=1 is set as the quantization condition B, it is possible to determine that bit=0 when the variance value of the periodicity No.=0 is large, and conversely to determine that bit=1 when the variance value of the periodicity No.=1 is large.

In other words, by associating the quantization condition, the spatial filter characteristics, and the periodicity of the thinning conditions, it is possible to realize multiplexing and separation easily. Here, there were two types of the periodicity No.—"0" and "1"—and the multiplexing code in the block was one bit but the multiplexing code can be set to something greater than this. Here, the type of the quantization condition and the type of the spatial filter, and the type of the periodicity No. of the thinning condition (the value of I) match.

In this way, even if comparison of power values for frequencies corresponding to a regularity of a quantization condition according to orthogonal transformation is not performed, it is possible to separate the code easily. Moreover, because this is processing in the real spatial domain (spatial position), it is possible to realize very high speed separation processing.

Note that the quantization conditions A and B, the spatial filters A and B, and the thinning units A and B are one example, and limitation is not made to this. Other periodicities may be held, and the values of spatial filter tap numbers, the block size for thinning, or the like, can be adjusted in accordance with intended use, objective, or the like.

For the processing of FIG. 11, to simply explain the explanation, explanation was given of processing repeatedly (looping) using the variable i that is the periodicity No., and the variable j that is the phase No. However, actually it is easier to repeatedly execute processing according to a pixel address in a block comprised of P×Q pixels. In other words, as shown in FIG. 12A and FIG. 12B, this is a method of storing in advance as a table two types of information—the periodicity No. and the phase No—with respect to each pixel address in the block, and then adding up converted values in variables corresponding to each periodicity No. and phase No. Through this method, by just processing a portion for P×Q pixels, it is possible to calculate in parallel an add-up value for each group of the periodicity No. and the phase No.

In addition, through the processing of FIG. 11, the code is determined by calculating a variance of an addition result for pixel values (converted values) after filtering via a spatial filter, and then performing a large/small comparison of the variance values, but the determination is not limited to this. It is also possible to use a method of comparing evaluation functions rather than variance values. For a bias of an addition result for the converted value, because a value tends to protrude at a time for a single phase when a phase is shifted, it is good if a "degree of variation" can be evaluated.

For example, to evaluate the degree of variation it is possible to use an evaluation function such as one of those shown below rather than the variance value.

1. An evaluation function of calculating a difference between a maximum and minimum of add-up values into which converted values are added up.

2. An evaluation function that calculates, for the add-up values into which the converted values are added up, either a difference between the maximum value and the second largest value, or a difference between the minimum and the second smallest value.

3. An evaluation function that calculates a maximum value for a difference in previous/succeeding orders when generating a histogram for add-up values into which converted values are added up.

Although the evaluation functions 1 to 3 concern an absolute difference value, a relative ratio between a difference value and a converted value or the sum total of the pixel values, the converted values or the like can also be used as the evaluation function. In addition, explanation was given of an example of binarizing quantization values, but limitation is not made to this.

In this way, the quantization condition can be changed by using block units comprised of M×N pixels of an image and predetermined information can be embedded for the image by quantizing the image according to the quantization condition in the first embodiment. Accordingly, information can be embedded in an image while suppressing degradation of image quality, at high speed and where it is possible to extract embedded information precisely, compared to conventional information embedding method such as an information embedding method using an orthogonal transformation for example.

Next, explanation is given for continuous capturing of multiplexed printed material by the camera-equipped mobile terminal 104. In the present embodiment, it is assumed that additional information comprising of large capacity data such as audio data or moving image data is embedded into a printed material. Therefore, explanation is given hereinafter assuming that the additional information is embedded on the whole printed material.

When multiplexed information (additional information) of a printed material is read using the camera-equipped mobile terminal 104, the camera-equipped mobile terminal 104 must be caused to approach the printed material to a distance close enough that it is possible to analyze the additional information. However, for example if the additional information is embedded on the whole printed material or the size of the printed material is larger than capturing range for which the camera-equipped mobile terminal 104 can analyze the additional information, the additional information of the entire range of the printed material cannot be captured in a single capturing. In such a case, it is necessary to capture the entire range dividing over a plurality of times while moving the camera-equipped mobile terminal 104 over the printed material. In the present embodiment, such capturing is called continuous capturing.

Hereinafter, explanation of the detail of continuous capturing is given using FIG. 13 and FIG. 14.

Figure 14:
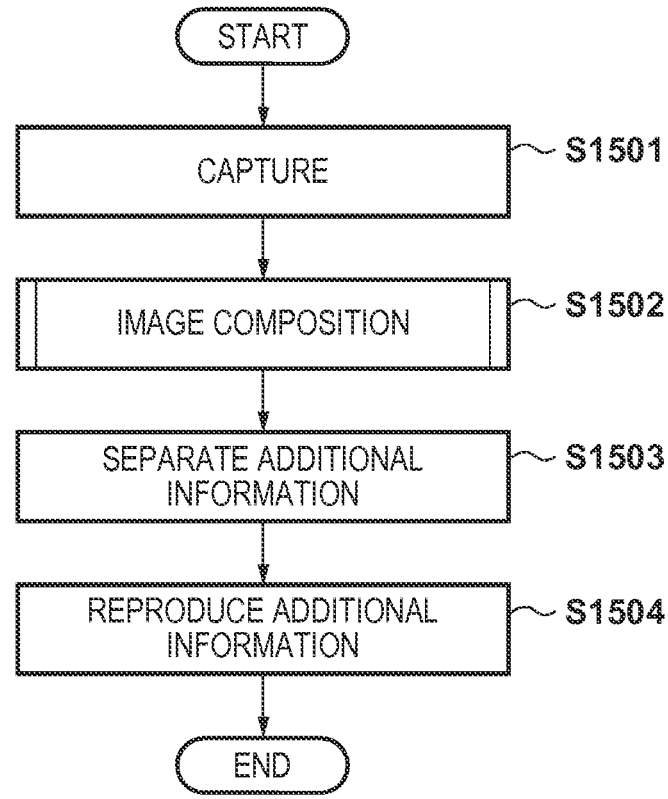
FIG. 14 is a flowchart for illustrating processing executed by the camera-equipped mobile terminal.

A user first executes processing shown in FIG. 14 by activating an additional information separating application of the camera-equipped mobile terminal 104. Note that, the processing shown in FIG. 14 is realized by the CPU 721 of the separating apparatus 106 of the camera-equipped mobile terminal 104 executing a control program for the additional information separating application stored in the ROM 722.

The camera-equipped mobile terminal 104 captures a printed material (multiplexed printed material) on which the additional information is embedded based on a user operation in step S1501. In the capturing, for example the user firstly adjusts the camera-equipped mobile terminal 104 to a height where the multiplexed pattern embedded into the printed material can be read, positioning the camera-equipped mobile terminal 104 at the top-left portion of the printed material. Then, as shown in FIG. 13, continuous capturing is performed moving the camera-equipped mobile terminal 104 in a rightward direction. Capturing is executed by detecting a pressing of a shutter release button physically mounted on the camera-equipped mobile terminal 104, for example. Images obtained by completing each capturing of the continuous capturing are stored on the RAM 723 sequentially. At that time, attribute information such as a unique identification number or a video recording date is added for each image.

Note that, in the continuous capturing, subsequent capturing is executed while overlapping the capturing range of immediately previous capturing, so that a plurality of images obtained by continuous capturing are composed (step S1502) in one image. In other words, as shown in FIG. 13, continuous capturing is executed so that overlapping area occurs in capturing range of each capturing.

Here, when a moving velocity of the camera-equipped mobile terminal 104 is too fast in the continuous capturing, it is not able to keep up at a shutter speed set upon initiation of continuous capturing and an omission may occur in an image capturing area of the printed material. In such a case, guidance can be performed on a screen of the camera-equipped mobile terminal 104 so that the moving speed of the camera-equipped mobile terminal 104 is reduced, for example by displaying a message to instruct the user to reduce the moving speed on the display 109. Alternatively, the moving speed can be calculated from an accelerometer 110 of the camera-equipped mobile terminal 104, and shutter speed of the camera-equipped mobile terminal 104 can be set automatically in accordance with the moving speed. Also, configuration may be taken such that an uncaptured image capturing area on the printed material is calculated while combining the captured image, and guidance of the image capturing area is displayed to the user on the display 109.

Figure 13:
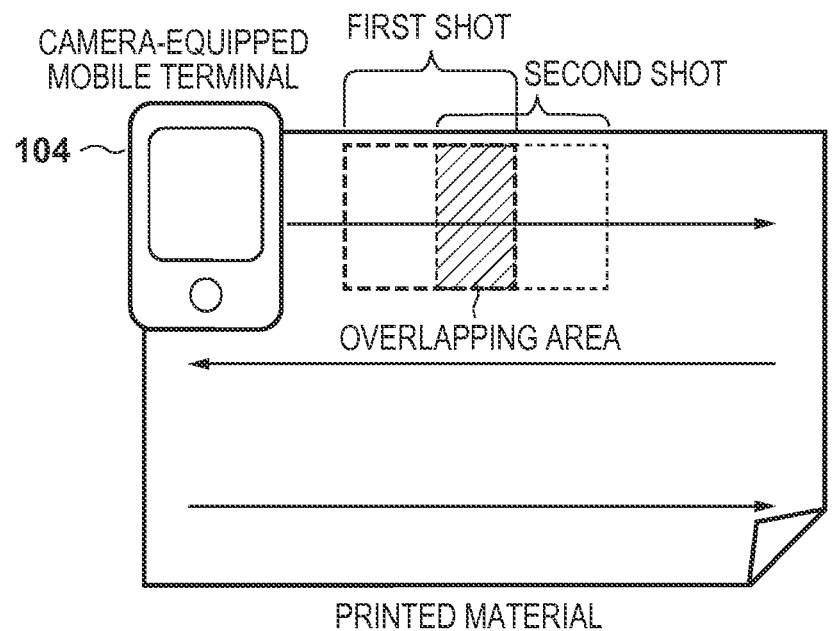
FIG. 13 is a view for explaining acquisition of additional information of a printed material by continuous capturing.

Then, as shown in FIG. 13, when capturing of one line of a printed material ends, the user moves the camera-equipped mobile terminal 104 to a lower line, and next moves the camera-equipped mobile terminal 104 in a leftward direction, and continuous capturing is performed similarly. Thus, while scanning the entire range of a printed material, continuous capturing is performed right up until the end so that an omission of a capturing location of the printed material does not occur. Here, the movement direction under continuous capturing of the camera-equipped mobile terminal 104 is not limited to the directions shown in FIG. 13. If all of the additional information (multiplexed information) embedded into the printed material can be captured by a method, the movement direction or the size of overlapping area of the camera-equipped mobile terminal 104 is not limited.

In step S1502, the camera-equipped mobile terminal 104 composes a plurality of images obtained by continuous capturing and generates a composite image. More specifically, by detecting an order of captured images and overlapping areas within consecutive images based on attribute information added for the image, a plurality of images are composed as a single image. For example, image processing such as general panorama composition processing can be used for the image composition. Alternatively, configuration may also be taken such that a movement direction and a movement distance are calculated by the accelerometer 110 of the camera-equipped mobile terminal 104, and a plurality of images obtained by continuous capturing are composed from the calculation result.

Note that details of the image composition of step S1502, which is characteristic processing of the first embodiment, are explained later using FIG. 15.

In step S1503, the camera-equipped mobile terminal 104 separates (extracts) additional information embedded in the composite image from the composite image (multiplexing decoding of the multiplexed information). Details of the separation processing are as explained through FIG. 11. Note that if the additional information cannot be read normally from the composite image (cannot be separated), it is possible to display an error message prompting the performance of continuous capturing once again on the display 109 of the camera-equipped mobile terminal 104.

In step S1504, the camera-equipped mobile terminal 104 reproduces the separated additional information. The additional information reproduced here may be a file that can be processed by the camera-equipped mobile terminal 104, such as audio data, moving image data, image data, a link destination for the Internet, or text data, but the type of the file is not limited. For example, if the additional information embedded in the printed material is moving image data, the camera-equipped mobile terminal 104 reproduces the moving image data using its own moving image reproduction function. Alternatively, configuration may be made to link to another moving image reproduction application stored in the camera-equipped mobile terminal 104, and cause the reproduction of the moving image data.

Note that, continuous capturing may be capturing using a still image sequential image sensing mode arranged in the camera-equipped mobile terminal 104, or may be, extracting frames and dividing them as image data after capturing using a moving image mode. It is also possible to execute continuous capturing using a digital still camera, rather than the camera function (the image sensor 105/the second image sensor 111) of the camera-equipped mobile terminal 104. In such a case, a plurality of images obtained using continuous capturing are incorporated in an information processing apparatus, such as a PC (personal computer). Configuration may also be taken such that the additional information separating application is activated on an OS of the PC, the captured plurality of images are composed, and separation of the additional information from the composite image is performed.

When capturing the printed material by the camera-equipped mobile terminal 104, there are cases in which a photographic subject of the printed material cannot be distinguished due to a reflection from a light source such as room illumination, and the captured image is largely degraded. In particular, a sheet having a high glossiness is often used for a high image quality print of a photograph, an album, or the like, but while on one side the appearance of the glossiness is very good, degradation of a captured image due to reflection is large. If an image in which a reflection is present is used as is in an image composition, this becomes a cause of degradation of image composition precision. Accordingly, in the first embodiment, image composition that considers this reflection is executed (step S1502). The image composition is characterized by configuring so that an evaluation of reflection in a captured image of printed material is performed, and by performing an evaluation of an overlapping area in the image based on the reflection evaluation result, image composition with a higher degree of accuracy for images in which reflection is present is possible.

Using the flowchart of FIG. 15, explanation is given regarding details of the image composition.

In step S1601, the camera-equipped mobile terminal 104 inputs processing target images. Images here are captured images of the printed material obtained using the processing of step S1501 in FIG. 14.

In step S1602, the camera-equipped mobile terminal 104 extracts feature amounts of the input images. As an example of extracting a feature amount, an image is searched for pixels for which an edge amount is greater than or equal to a predetermined value, and an image for which a rectangle of ±n vertical/horizontal pixels from centered a position of the respective pixels found through the search is extracted is set for a feature amount. Alternatively, configuration may be taken to set a collection of visually difficult-to-distinguish multiplexed patterns as explained using FIGS. 6A and 6B as feature amounts. Furthermore, besides these feature amounts, anything that represents a feature of the image obtained from the shooting time, area of the photographic subject, or the like, may be used.

In step S1603, the camera-equipped mobile terminal 104 evaluates a poor quality area of the input images. Image degradation due to a reflection, an aberration blurring, a lens abrasion, or the like are examples of poor quality areas, but here explanation is given of detection of a reflection area.

When capturing printed material, the following two points are main characteristics of a reflection area.

1. When a light source is reflected, a location in which a reflection area is present has a high luminance, and detail of the printed material is lost. In the case of the image shown in FIG. 16A, the reflection area has a high luminance value, and a large portion of an image of person A cannot be obtained.

2. The position of the reflection area does not substantially change in the captured image. FIG. 16A and FIG. 16B are images capturing different locations in the printed material. As shown in FIG. 16A and FIG. 16B, when capturing the printed material while moving the camera-equipped mobile terminal 104, although the relative position between the photographic subject of the printed material and the position of the reflection area changes, the position of the reflection area does not change substantially for an angle of view range of the camera-equipped mobile terminal 104. Accordingly, in the case in which a high luminance area exist at substantially the same position proximity for a plurality of captured images, it is possible to treat the high luminance area as a light source reflection area. It is possible to make a determination by comparing the high luminance area to a predetermined high luminance threshold, and detecting an area having luminance higher than the predetermined high luminance threshold.

It is also possible make the determination dynamically, without having the high luminance threshold as a predetermined value. As shown in FIG. 17, depending on the camera-equipped mobile terminal 104, a model in which two or more cameras are incorporated may be present. In this way, in the case in which the camera-equipped mobile terminal 104 is equipped with two or more cameras, configuration may be taken to determine the high luminance threshold by analyzing a captured image from a sub-camera other than a main camera that captures the printed material. As an example, in the case of the camera-equipped mobile terminal 104 shown in FIG. 17, for an image capture apparatus, at the same time that the printed material is captured by a back camera, a light source (an environment light in the environment in which the printed material is captured) on a side opposite the printed material is captured using a front camera. By analyzing a captured image for the front camera, it is possible to estimate a light source and luminance thereof, and finally determine the high luminance threshold.

In addition to reflection of a light source, if a shadow of another object is reflected, because a low-luminance area having luminance lower than a predetermined luminance is present close to the same position in a plurality of captured images, it is possible to treat the low-luminance area as a shadow reflection area. Additionally, in a case in which the light source is a red light, a yellow light, or the like, configuration may be taken to detect a reflection area using chromatic value instead of luminance. In other words, the camera-equipped mobile terminal 104 evaluates whether an evaluation target area is a poor quality area based on a luminance of the evaluation target area and a position of the evaluation target area.

It is also possible to evaluate a reflection area in accordance with whether or not a visually difficult-to-distinguish multiplexed pattern (additional information), as explained using FIGS. 6A and 6B, is detected.

Furthermore, aside from a light source and a shadow, there are cases in which other objects are reflected in a printed material. If an object is reflected, even if not to the level of a light source, it is still a cause of degradation of a captured image. When determining reflection of an object, cases are divided into those in which a reflection object is known beforehand and those in which the reflection object is not known beforehand.

If the reflection object is known beforehand, information of the reflection object is saved beforehand in the RAM 723 of the separating apparatus 106 of the camera-equipped mobile terminal 104. Then, a plurality of images of the printed material captured by continuous capturing are compared to information for the reflection object that is saved beforehand, and it is possible to evaluate the reflection area.

If the reflection object is not known beforehand, it is possible to use a captured image from a sub-camera other than the main camera that captures the printed material. By comparing the captured image of the sub-camera with information of an edge, a color, or the like, and the captured image of the printed material, it is possible to evaluate the reflection area. In other words, the camera-equipped mobile terminal 104 evaluates whether an evaluation target area is a poor quality area based on an edge of the evaluation target area and a position of the evaluation target area.

Note that either step S1602 or step S1603 of FIG. 15 may be performed first.

In step S1604, the camera-equipped mobile terminal 104 evaluates an overlapping area based on feature amounts extracted in step S1602 and the poor quality area evaluation result in step S1603. In the first embodiment, the poor quality area is excluded from the image to be processed, and overlapping area is calculated from the remaining image. In other words, by excluding the poor quality area, the effect on the image composition of the poor quality area is eliminated.

In step S1604, the camera-equipped mobile terminal 104 evaluates the overlapping area based on the feature amounts extracted in step S1602 and the evaluation result for the poor quality area in step S1603. In the first embodiment, the poor quality area is excluded from the image to be processed, and the overlapping area is calculated from the remaining image. In other words, by excluding the poor quality area, the effect on the image composition of the poor quality area is eliminated. More specifically, although reflection areas are present in both FIG. 16A and FIG. 16B, because the reflection areas are not evaluated as overlapping areas, eliminating the effect on image composition of the poor quality area is possible.

FIG. 16E and FIG. 16F are results in which an overlapping area is calculated from the images of FIG. 16C and FIG. 16D. As an example of a method of calculating the overlapping area, explanation is given for a method of calculating an overlapping area of two images. Note that the case of an image composition of two or more images is realized by repeatedly performing image composition for two images, in accordance with the number of images for which image composition is to be performed.

Initially, a plurality of rectangular images (feature amounts), which are feature amounts extracted in step S1602, are calculated from photographic subject edge amounts included in the images of FIG. 16C and FIG. 16D.

Next, the rectangular images (feature amounts) obtained from the first image are overlaid on the second image, absolute values for differences in pixel values in units of pixels are calculated, and the total value thereof is calculated. This process is performed a plurality of times, while moving within the second whole image, or within a predetermined range of a second image. Then whether a minimum value for a calculated plurality of total values is a sufficiently small value (whether there are reliable corresponding feature amounts) is determined by comparison to a predetermined threshold. If less than the predetermined threshold, coordinates (x, y) for a rectangular image in the first image, coordinates (x', y') for the second image for which the minimum value was calculated, and the value of the minimum value are registered to the RAM 723 in in a list of corresponding feature amounts. It is possible to perform the above processing for all feature amounts extracted from the first image, to calculate the corresponding feature amounts and the minimum value thereof. Then, from all of the minimum values in the list of the corresponding feature amounts, an average of the minimum values is calculated, and the average is held in the RAM 723 as a degree of matching for the image.

Finally, from the list of the corresponding feature amounts, it is possible to calculate an overlapping area of the second image. Note that, a method other than this method is may be employed if the other method can calculate an overlapping area of images from feature amounts of the images, and there is no limitation to this method.

In addition, configuration may be taken to use a method of calculating an overlapping area that does not completely exclude the poor quality area, but instead changes a weight (a degree of importance of the poor quality area) of the poor quality area. For example, regarding a feature amount of an area evaluated as a poor quality area, it is possible to change a weight for the poor quality area by changing the above-described corresponding feature amount minimum value. In addition, configuration may be taken to change the weight of the poor quality area by changing an edge amount threshold for feature amount extraction for an area evaluated as a poor quality area, in the step of extracting feature amounts of the images of step S1602. Another method may be employed if the other method changes a weight of the poor quality area, and there is no limitation to this method.

In step S1605, based on the evaluation result in step S1603 and the evaluation result in step S1604, the camera-equipped mobile terminal 104 composes the images and generates a composite image.

FIG. 16G is an image that composes each image of FIG. 16E and FIG. 16F. While a reflection area is present in the overlapping area of FIG. 16E, a reflection area is not present in the overlapping area of FIG. 16F. Accordingly, the overlapping area of FIG. 16F is employed for the image composition. In other words, from two images, if a poor quality area is present in the overlapping area of one image, then the overlapping area that does not include a poor quality area of the remaining image is employed.

Alternatively, configuration may be taken to use, from the overlapping area that does not include a poor quality area, only a portion that includes an area corresponding to the poor quality area.

As explained above, by the first embodiment, the camera-equipped mobile terminal evaluates a poor quality area from a plurality of images, and based on feature amounts from the plurality of images, specifies an overlapping area. The camera-equipped mobile terminal then performs an image composition based on the poor quality area evaluation result and the overlapping area specification result, and extracts additional information from the composed image. By the first embodiment, in a case of capturing an image of a printed material by capturing dividing over a plurality of times and then composing the obtained plurality of images, by considering reflection in the printed material, it is possible to perform the image composition at higher precision. Thereby, it is possible to obtain a large amount of additional information included in the printed material.

Note that configuration may be taken to not execute the image composition of step S1605, and extract additional information of necessary image areas by using the poor quality area and the overlapping area calculated in step S1603 and step S1604 and the position information therefor, and to subsequently integrate the additional information.

Second Embodiment

In the first embodiment, a configuration of evaluating the overlapping area is given in step S1604 of FIG. 15, but if the evaluation is poor, there is a possibility that the overlapping area cannot be calculated. Accordingly, in the second embodiment, explanation is given for a configuration of realizing image composition even in such a case.

FIG. 18A and FIG. 18B are images that include a poor quality area evaluated in step S1603 of FIG. 15. FIG. 18C and FIG. 18D are images resulting from the poor quality area being excluded from the images of FIG. 18A and FIG. 18B respectively. As shown in FIG. 18C and FIG. 18D, for each image, it is possible to extract similar feature amounts, but a photographic subject that could be an overlapping area is not present. Accordingly, in such a case, in step S1604 of FIG. 15, it is not possible to calculate an overlapping area.

Accordingly, in the second embodiment, if the overlapping area cannot be calculated in step S1604, additional information that can be separated from each of a plurality of images that are composition targets is used to perform image composition. Using the flowchart of FIG. 19, explanation is given regarding details of the image composition. Note that the flowchart of FIG. 19 has a configuration in which step S1901, step S1902, and step S1903 are added to the flowchart of FIG. 15 of the first embodiment. Therefore, here, for steps the same as that in the flowchart of FIG. 15, the same step number is added, and explanation thereof is omitted; explanation is given of details of newly added step S1901, step S1902 and step S1903.

In step S1901, the camera-equipped mobile terminal 104 determines whether an overlapping area is present. It is possible to realize this determination, for example, by using an evaluation result of step S1604. Hereinafter, an example of this is described.

Registered in a list of corresponding feature amounts held in the RAM 723 by the evaluation result in step S1604 are feature amounts for an image area of a predetermined range determined to be reliable corresponding feature amounts, in a predetermined range in an image that is a composition target. Accordingly, if feature amounts are not present in the list of corresponding feature amounts, or there are less than a predetermined number of them, it is possible to determine that an overlapping area is not present.

Even in the case where the predetermined number or more of feature amounts are present in the list of the corresponding feature amounts, it is possible to determine the overlapping area based on a degree of matching of the images. For example, if a degree of matching for images is less than or equal to a predetermined threshold, it is possible to determine that an overlapping area is not present.

When it is not possible to extract a feature amount (an edge greater than or equal to a predetermined threshold) for a processing target image in step S1602, it is possible to determine that the overlapping area is not present.

Note that, a method other than this method may be employed if the method can determine the existence of an overlapping area based on the result of extraction of feature amounts of the images, and there is no limitation to this method.

As a result of the determination of step S1901, if an overlapping area is present (YES in step S1901), the processing proceeds to step S1605. However, if an overlapping area is not present (NO in step S1901), in step S1902 the camera-equipped mobile terminal 104 is not able to calculate the overlapping area, and separates the additional information from the composition target images. The processing corresponds to step S1503 of FIG. 15. Hereinafter, FIGS. 20A-20G are used to explain a concrete example therefor.

Figure 20A:
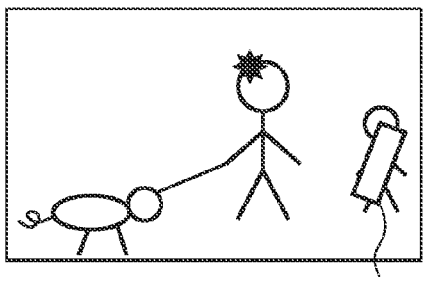
FIGS. 20A-20G are views for explaining a concrete example of image composition.
Figure 20B:
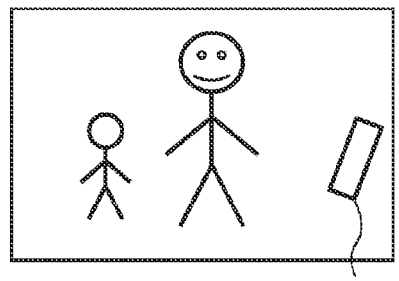
Figure 20C:
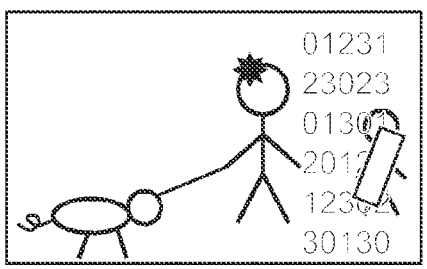
Figure 20D:
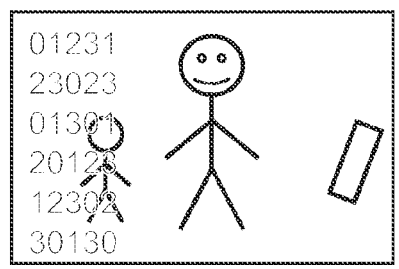

FIG. 20A and FIG. 20B are captured images for a printed material in which two bits of data (0 to 3) for each block (having a unit of a predetermined area) are embedded as additional information. FIG. 20C and FIG. 20D are images that include a result extracted after separating additional information from the images of FIG. 20A and FIG. 20B respectively. As shown in FIG. 20C and FIG. 20D, the additional information (0 to 3) is associated with each block in the image.

In step S1903, the camera-equipped mobile terminal 104 evaluates an overlapping area based on the result of separating the additional information. As an example of a method for evaluating an overlapping area, it is possible to set as an overlapping area an image area in which a matching rate between additional information separated from the image of FIG. 20C and additional information separated from the image of FIG. 20D is largest. It is possible to calculate a reliability degree for the overlapping area by using a matching rate for the additional information and the area of the area in which the additional information matches, and set the area for which the reliability degree is largest as the overlapping area. For example, in the case of the images of FIG. 20C and FIG. 20D, it is possible to calculate the overlapping area as with FIG. 20E and FIG. 20F.

Note that the present invention is not limited to this method and another method may be used if the other method can evaluate the overlapping area based on the additional information.

In step S1605, based on the evaluation result in step S1603 and the evaluation result in step S1903, the camera-equipped mobile terminal 104 composes the images and generates the composite image.

Figure 20E:
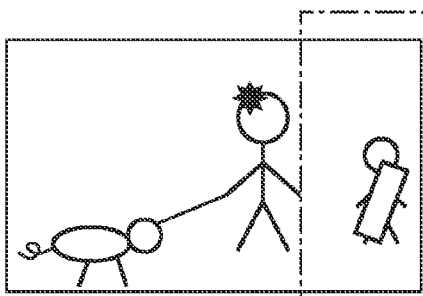
Figure 20F:
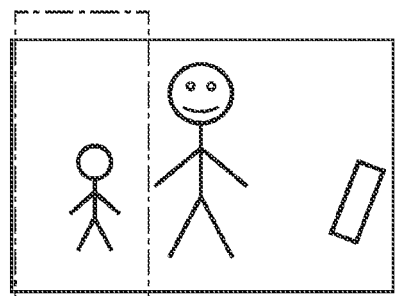
Figure 20G:
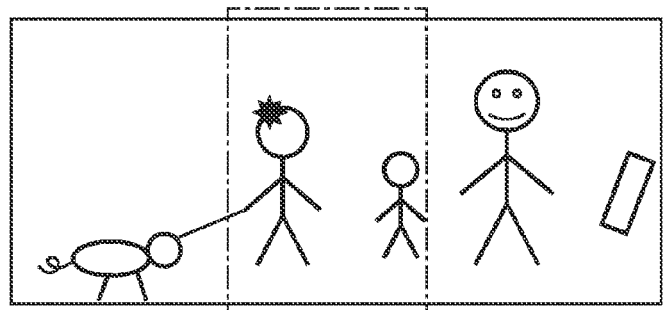

FIG. 20G is an image that composes each image of FIG. 20E and FIG. 20F. While a reflection area is present in the overlapping area of FIG. 20E, a reflection area is not present in the overlapping area of FIG. 20F. Accordingly, the overlapping area of FIG. 20F is employed for the image composition. In other words, from two images, if a poor quality area is present in the overlapping area of one image, then the overlapping area that does not include a poor quality area of the remaining image is employed.

As explained above, by the second embodiment, even if a feature amount (edge information) necessary to evaluate the overlapping area for a captured image is lost due to a reflection, it is possible to compose images with better precision by using the additional information of the images.

Third Embodiment

In the third embodiment, explanation is given for a configuration in which, if the range of a poor quality area of an image is sufficiently small or if the poor quality area does not have much of an effect on the extraction of feature amounts of the image, an evaluation of an overlapping area for the image is first performed without considering the poor quality area, and then the image composition is performed.

Figure 21:
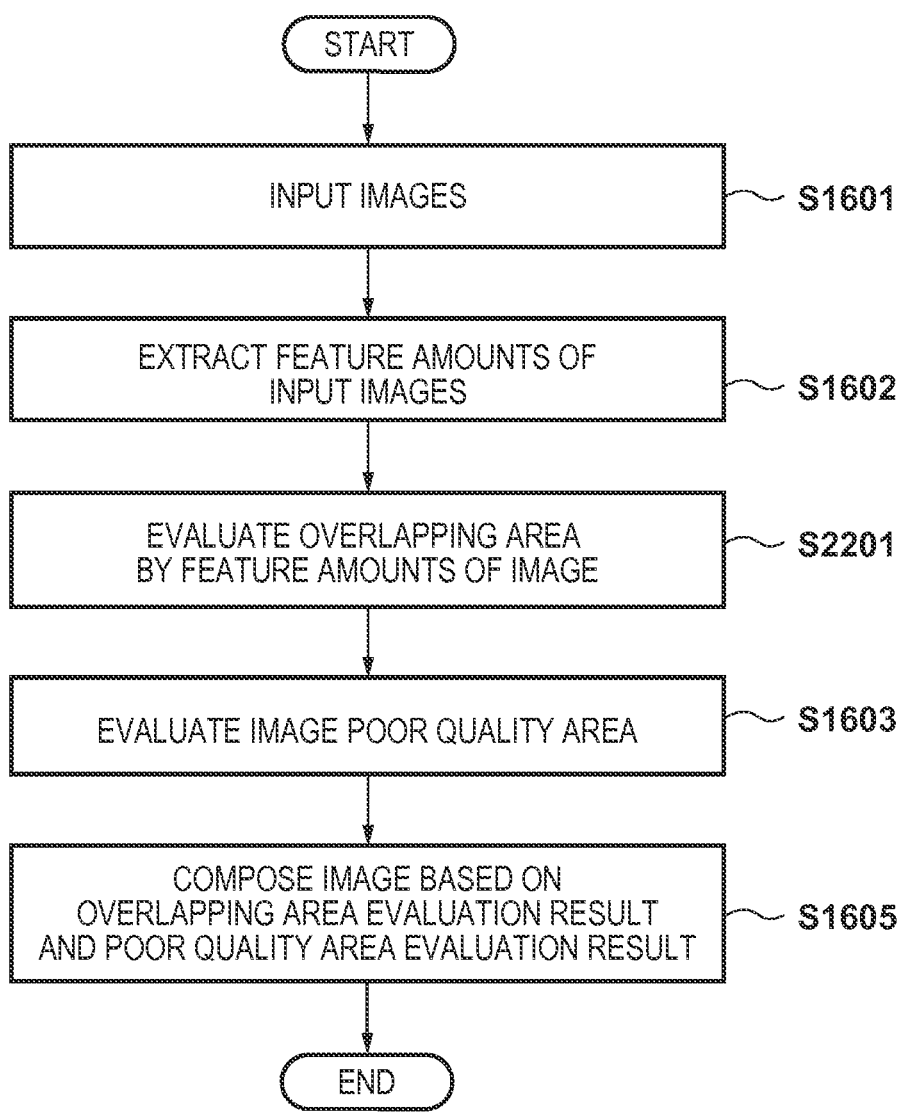
FIG. 21 is a flowchart for illustrating detail of image composition.

Using the flowchart of FIG. 21, explanation is given regarding details of the image composition of the third embodiment. Note that the flowchart of FIG. 21 has a configuration in which step S2201 is added in front of step S1603 in the flowchart of FIG. 15 of the first embodiment. In other words, there is a configuration in which, before step S1603 (poor quality area evaluation of the images), step S2201 (overlapping area evaluation of the images) is performed. Therefore, here, for steps that are the same as those in the flowchart of FIG. 15, the same step number is added below, and explanation thereof is omitted; explanation is given of details of newly added step S2201.

Figure 22A:
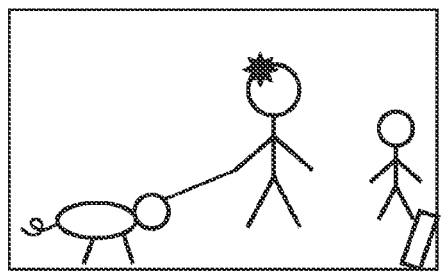
FIGS. 22A-22G are views for explaining a concrete example of image composition.
Figure 22B:
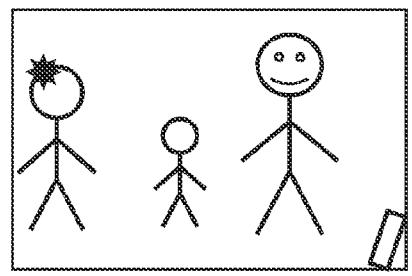
Figure 22C:
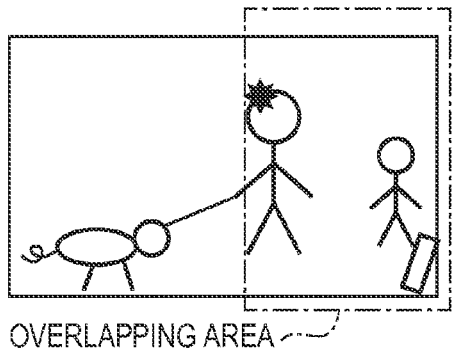
Figure 22D:
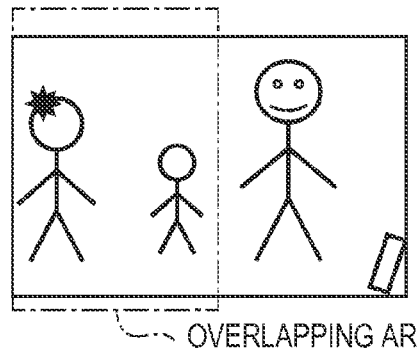
Figure 22E:
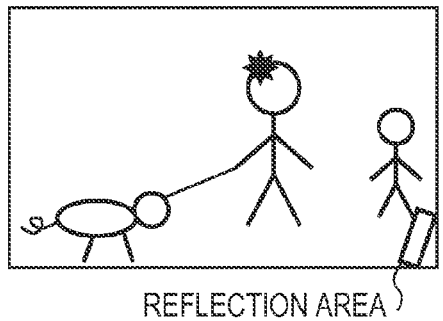
Figure 22F:
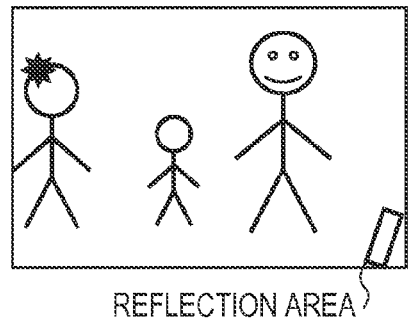
Figure 22G:
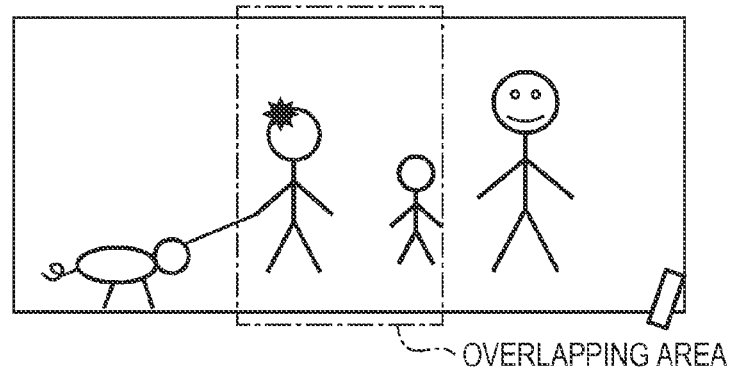
Figure 23A:
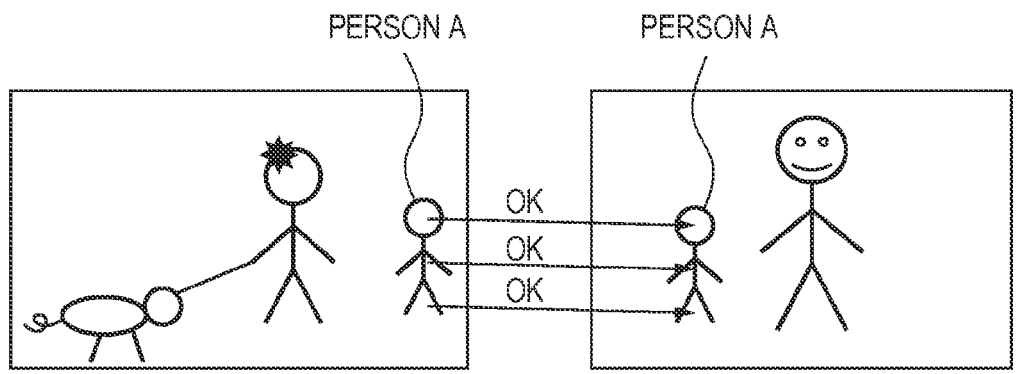
FIGS. 23A and 23B are views for explaining a calculation of an overlapping area of images.
Figure 23B:
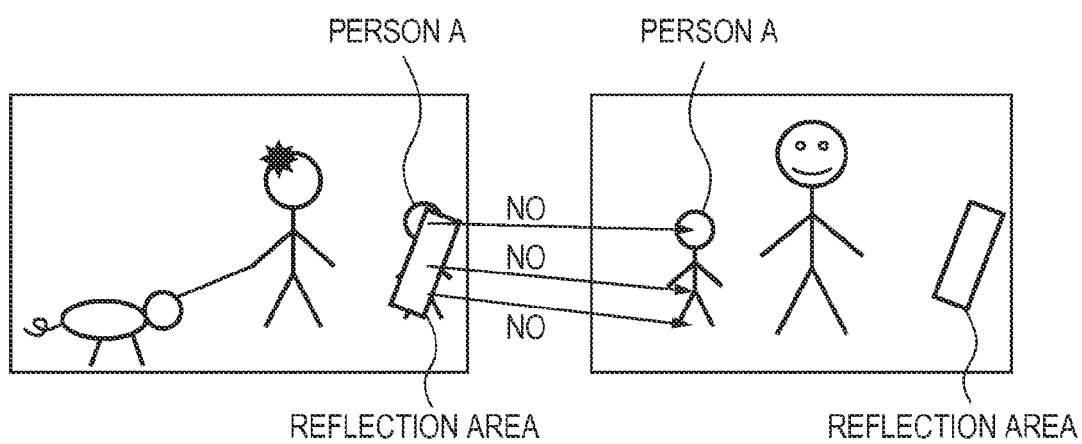

In step S2201, the camera-equipped mobile terminal 104 evaluates an overlapping area of an image without considering a poor quality area. FIG. 22A and FIG. 22B are captured images in which the range of the poor quality area is less than a predetermined range. FIG. 22C and FIG. 22D are images resulting an overlapping area of the images of FIG. 22A and FIG. 22B being evaluated respectively. Here, because the range of the poor quality area is sufficiently small, it is possible to evaluate the overlapping area correctly. FIG. 22E and FIG. 22F are images that include a poor quality area (a reflection area) evaluated in step S1603. In the case of the third embodiment, a composite image of FIG. 22G is obtained from the relationship between the overlapping areas (FIG. 22C and FIG. 22D) and the poor quality areas evaluated in step S1603 (FIG. 22E and FIG. 22F) because it is possible to calculate the overlapping areas at step S2201.

Note that either of step S2201 and step S1603 of FIG. 21 may be performed first. In addition, as necessary, configuration may also be taken such that processing of step S1603 is omitted.

As explained above, by the third embodiment, even if a poor quality area is not evaluated, if an overlapping area can be evaluated, it is possible to use the evaluated overlapping area to compose images. Thereby, it is possible to omit evaluation of the poor quality area as necessary, and it is possible to reduce a processing load.

Note that configuration may be taken to not execute the image composition of step S1605, and extract additional information of necessary image areas by using the poor quality area and the overlapping area calculated in step S2201 and step S1603 and the position information therefor, and to subsequently integrate the additional information.

Fourth Embodiment

In accordance with intended use, objective, or the like, an embodiment combining any of the above described first to third embodiments is also possible. For example, configuration may also be taken such that, after evaluating the overlapping area in the third embodiment, the determination of the presence of the evaluated overlapping area in the second embodiment is performed.

The configurations of the above described first to third embodiments evaluate a predetermined area for a plurality of images, and based on the evaluation result, the plurality of images are composed. Here, the predetermined area, in the first and third embodiment, corresponds to at least one of an overlapping area and a poor quality area, and in the second embodiment, corresponds to a block (area) in which the additional information is embedded. In this way, a similarity of predetermined areas between a plurality of images is evaluated, and if the similarity is high, it is possible to treat the predetermined areas as the same area, and compose the plurality of images so as to overlap the areas, to thereby generate a whole image for a printed material that was captured dividing over a plurality of times.

In addition, evaluation of the similarity of the predetermined areas between the plurality of images is performed based on feature information regarding the images. Here, feature information is a concept that includes, in the first embodiment and the third embodiment, feature amounts (for example, a luminance or a density value) based on pixels that configure the image, and in the second embodiment, in addition to the feature amounts based on luminance for pixels of the image, additional information that is embedded in the image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-188253, filed Sep. 16, 2014 which is hereby incorporated by reference herein in its entirety.

What is claimed is:

1. An image processing apparatus that extracts additional information embedded in a printed material, the apparatus comprising:
   an input unit configured to input a plurality of images obtained by capturing, dividing over a plurality of times, a printed material in which additional information is embedded;
   a unit configured to extract feature information concerning each of the plurality of images input by the input unit;
   an evaluation unit configured to evaluate a poor quality area in the images;
   a specifying unit configured to specify an overlapping area of the plurality of images based on the feature information; and
   an extraction unit configured to extract additional information embedded in the printed material, based on a result of the specifying by the specifying unit and a result of the evaluation by the evaluation unit.

2. The image processing apparatus according to claim 1, wherein the specifying unit specifies the overlapping area, which overlaps between the plurality of images, based on a degree of matching for the feature information between the plurality of images.

3. The image processing apparatus according to claim 1, wherein the evaluation unit evaluates whether or not an area of an evaluation target is a poor quality area based on a luminance of the area of the evaluation target and a position of the area of the evaluation target in the image.

4. The image processing apparatus according to claim 1, wherein the evaluation unit evaluates whether or not an area of an evaluation target is a poor quality area based on an edge of the area of the evaluation target and a position of the area of the evaluation target in the image.

5. The image processing apparatus according to claim 1, further comprising:
   a first image capturing unit configured to capture a printed material; and
   a second image capturing unit that is different to the first image capturing unit, wherein
   the evaluation unit evaluates the poor quality area in the images based on an image captured by the second image capturing unit.

6. The image processing apparatus according to claim 1, wherein
   the specifying unit specifies the overlapping area using an image from which the area evaluated to be the poor quality area by the evaluation unit is excluded.

7. The image processing apparatus according to claim 1, wherein
   the specifying unit specifies the overlapping area by changing a weight of the area evaluated to be the poor quality area by the evaluation unit.

8. The image processing apparatus according to claim 1, wherein the extraction unit does not extract additional information of the poor quality area included in the overlapping area.

9. The image processing apparatus according to claim 1, wherein in a case where the specifying unit cannot specify an overlapping area of the plurality of images based on the feature information, the specifying unit specifies an overlapping area based on additional information included in the plurality of images.

10. An image processing method for extracting additional information embedded in a printed material, the method comprising:

inputting a plurality of images obtained by capturing, dividing over a plurality of times, a printed material in which additional information is embedded;

extracting feature information concerning each of the inputted plurality of images;

evaluating a poor quality area in the images;

specifying an overlapping area of the plurality of images based on the feature information; and extracting additional information embedded in the printed material based on a result of the evaluating and a result of the specifying.

11. A non-transitory computer-readable storage medium storing a program for extracting additional information embedded in a printed material, wherein the program causes a computer to input a plurality of images obtained by capturing, dividing over a plurality of times, a printed material in which additional information is embedded;

to extract feature information concerning each of the inputted plurality of images;

to evaluate a poor quality area in the images;

to specify an overlapping area of the plurality of images based on the feature information; and to extract additional information embedded in the printed material based on a result of the evaluating and a result of the specifying.

\* \* \* \* \*